US012081368B2

(12) United States Patent
Bull et al.

(10) Patent No.: US 12,081,368 B2
(45) Date of Patent: *Sep. 3, 2024

(54) INTEGRATING AND CONTROLLING MULTIPLE LOAD CONTROL SYSTEMS

(71) Applicant: Lutron Technology Company LLC, Coopersburg, PA (US)

(72) Inventors: John H. Bull, Slatington, PA (US); Ram K. Prasad, Royersford, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 171 days.

This patent is subject to a terminal disclaimer.

(21) Appl. No.: 17/834,100

(22) Filed: Jun. 7, 2022

(65) Prior Publication Data

US 2022/0376951 A1 Nov. 24, 2022

Related U.S. Application Data

(63) Continuation of application No. 16/903,261, filed on Jun. 16, 2020, now Pat. No. 11,368,337, which is a (Continued)

(51) Int. Cl.
*H04L 12/66* (2006.01)
*H04L 43/04* (2022.01)
(Continued)

(52) U.S. Cl.
CPC .............. *H04L 12/66* (2013.01); *H04L 43/04* (2013.01); *H04L 43/0817* (2013.01); *H04L 67/125* (2013.01)

(58) Field of Classification Search
None
See application file for complete search history.

(56) References Cited

U.S. PATENT DOCUMENTS 6,477,373 B1 11/2002 Rappaport et al.
9,560,654 B1 1/2017 Velusamy et al.
(Continued)

FOREIGN PATENT DOCUMENTS

EP 3001115 A2 3/2016
WO 2013003813 A1 1/2013

OTHER PUBLICATIONS

Lutron, "Lutron Integration Protocol", Revision Y, Apr. 2, 2018, 161 pages.

*Primary Examiner* — Xavier S Wong
(74) *Attorney, Agent, or Firm* — Michael S. Czarnecki; Glen R. Farbanish; Philip N. Smith

(57) ABSTRACT

Systems and methods are disclosed for using one or more gateway systems for integrating multiple load control systems running multiple versions of software such that the load control systems may appear to a user and be controlled by the user as a unified load control system. Gateways that manage or have managed the same resource may be organized into a Gateway Group. Gateway Groups names may be used for prefix attachment to facilitate routing. For example, a Composite Gateway may receive a request associated with a resource from a user. The Composite Gateway may determine which Gateway actively manages that resource and/or is the Gateway is a member of a Gateway Group. The composite Gateway may then apply one or more policies to facilitate the request. For example, if the Composite Gateway receives an information request, it may apply an authorization policy, a routing policy, and/or an aggregation policy.

16 Claims, 11 Drawing Sheets

Related U.S. Application Data continuation of application No. 15/939,221, filed on Mar. 28, 2018, now Pat. No. 10,715,354, which is a continuation-in-part of application No. 15/900,520, filed on Feb. 20, 2018, now Pat. No. 11,098,918.

(60) Provisional application No. 62/461,195, filed on Feb. 20, 2017.

(51) Int. Cl.
  H04L 43/0817 (2022.01)
  H04L 67/125 (2022.01)

(56) References Cited

U.S. PATENT DOCUMENTS

| | | | | |
|---|---|---|---|---|
| 10,715,354 | B2* | 7/2020 | Bull | H04L 67/125 |
| 11,098,918 | B2* | 8/2021 | Bull | G05B 15/02 |
| 11,368,337 | B2* | 6/2022 | Bull | H04L 43/0817 |
| 2004/0152469 | A1 | 8/2004 | Yla-Outinen et al. | |
| 2007/0127475 | A1 | 6/2007 | Kuchibhotla et al. | |
| 2008/0279200 | A1 | 11/2008 | Shatzkamer et al. | |
| 2009/0089365 | A1 | 4/2009 | Serghi et al. | |
| 2009/0147718 | A1 | 6/2009 | Liu et al. | |
| 2011/0202293 | A1 | 8/2011 | Kobraei et al. | |
| 2011/0231320 | A1 | 9/2011 | Irving | |
| 2012/0324094 | A1* | 12/2012 | Wyatt | H04W 4/60 709/224 |
| 2013/0145183 | A1 | 6/2013 | Wada | |
| 2013/0304867 | A1 | 11/2013 | Raman | |
| 2014/0059347 | A1 | 2/2014 | Dougherty et al. | |
| 2014/0214225 | A1 | 7/2014 | Burke et al. | |
| 2014/0324192 | A1 | 10/2014 | Baskaran et al. | |
| 2014/0351573 | A1* | 11/2014 | Martini | H04L 63/0209 713/153 |
| 2015/0052345 | A1 | 2/2015 | Martini | |
| 2015/0134280 | A1 | 5/2015 | Narayan et al. | |
| 2017/0123390 | A1 | 5/2017 | Barco et al. | |
| 2018/0322284 | A1* | 11/2018 | Chiang | G06F 21/577 |
| 2019/0068400 | A1 | 2/2019 | Krikorian et al. | |

* cited by examiner

INTEGRATING AND CONTROLLING MULTIPLE LOAD CONTROL SYSTEMS

CROSS-REFERENCE TO RELATED APPLICATIONS

This application is a continuation of U.S. application Ser. No. 16/903,261 filed Jun. 16, 2020; which is a continuation of U.S. application Ser. No. 15/939,221 filed Mar. 28, 2018, now U.S. Pat. No. 10,715,354 issued Jul. 14, 2020; which is a continuation-in-part of U.S. application Ser. No. 15/900,520 filed Feb. 20, 2018, now U.S. Pat. No. 11,098,918 issued Aug. 24, 2021; all of which claim the benefit of U.S. Provisional Patent Application No. 62/461,195, filed Feb. 20, 2017, the entire disclosure of which is incorporated by reference herein.

BACKGROUND

A user environment, such as a residence, an office building, or a hotel for example, may be configured to include various types of load control systems. For example, a lighting control system may be used to control the lighting loads in the user environment. A motorized window treatment control system may be used to control the natural light provided to the user environment. A heating, ventilating, and air conditioning (HVAC) system may be used to control the temperature in the user environment. A given environment may include multiple load control systems.

SUMMARY

One issue with environments that include multiple load control systems may be that a user has to interact with the multiple systems individually, making it difficult for the user to interact with and control all of the systems, for example, together as one. It may be desirable to integrate multiple load control systems such that systems appear to a user and can be interacted with by the user as one unified system, for example.

According to one example, an apparatus may include at least one processor, and may further include at least one tangible memory device communicatively coupled to the at least one processor. The at least one tangible memory device may have software instructions stored thereon that when executed by the at least one processor direct the at least one processor to receive a first message from a web application, and based on the first message, communicate a second message on a communications connection to a load control system. The communications connection may have a uniform resource identifier (URI) associated with it, the load control system may be configured to control electrical loads for an environment, the load control system may include a control device, and the load control system may associate a URI with the control device. Responsive in part to communicating the second message to the load control system, the software instructions, when executed by the at least one processor, may further direct the at least one processor to receive a third message on the communications connection from the load control system. The third message received from the load control system may include the URI of the control device. The software instructions, when executed by the at least one processor, may further direct the at least one processor to modify the URI of the control device to include the URI associated with the communications connection, and based at least in part on the third message received from the load control system, communicate a fourth message to the web application. The fourth message may include the modified URI of the control device. The software instructions, when executed by the at least one processor, may further direct the at least one processor to receive from the web application a fifth message that includes the modified URI of the control device, and responsive to receiving the fifth message from the web application, remove the URI associated with the communications connection from the modified URI of the control device, and based on the fifth message, communicate a sixth message on the communications connection to the load control system. The communicated sixth message may include the URI of the control device without the URI associated with the communications connection.

According to another example, method may include receiving by at least one processor a first message from a web application, and based on the first message, communicating by the at least one processor a second message on a communications connection to a load control system. The communications connection may have a uniform resource identifier (URI) associated with it, the load control system may be configured to control electrical loads for an environment, the load control system may include a control device, and the load control system may associate a URI with the control device. Responsive in part to communicating the second message to the load control system, the method may include receiving by the at least one processor a third message on the communications connection from the load control system. The third message received from the load control system may include the URI of the control device. The method may include modifying by the at least one processor the URI of the control device to include the URI associated with the communications connection, and based at least in part on the third message received from the load control system, communicating by the at least one processor a fourth message to the web application. The fourth message may include the modified URI of the control device. The method may include receiving by the at least one processor from the web application a fifth message that comprises the modified URI of the control device, and responsive to receiving the fifth message from the web application removing by the at least one processor the URI associated with the communications connection from the modified URI of the control device, and based on the fifth message, communicating by the at least one processor a sixth message on the communications connection to the load control system. The communicated sixth message may include the URI of the control device without the URI associated with the communications connection.

Systems and methods are disclosed for using one or more gateway systems for integrating multiple load control systems running multiple versions of software such that the load control systems may appear to a user and be controlled by the user as a unified load control system. This may be accomplished by organizing Gateways that manage or have managed the same resource into a Gateway Group. Gateway Groups may be given names, which may be used for prefix attachment to facilitate routing. For example, a Composite Gateway may receive a request associated with a resource from a user. The Composite Gateway may determine which Gateway actively manages that resource and/or is the Gateway is a member of a Gateway Group. The composite Gateway may then apply one or more policies to facilitate the request. For example, if the Composite Gateway receives an information request, it may apply an authorization policy, a routing policy, and/or an aggregation policy.

One advantage of such example systems and methods may be that multiple load control systems may be integrated such that the load control systems may appear to a user and be controlled by the user as a unified load control system.

The above advantages and features are of representative embodiments only. They are not to be considered limitations. Additional features and advantages of embodiments will become apparent in the following description, from the drawings, and from the claims.

DETAILED DESCRIPTION

Figure 1:
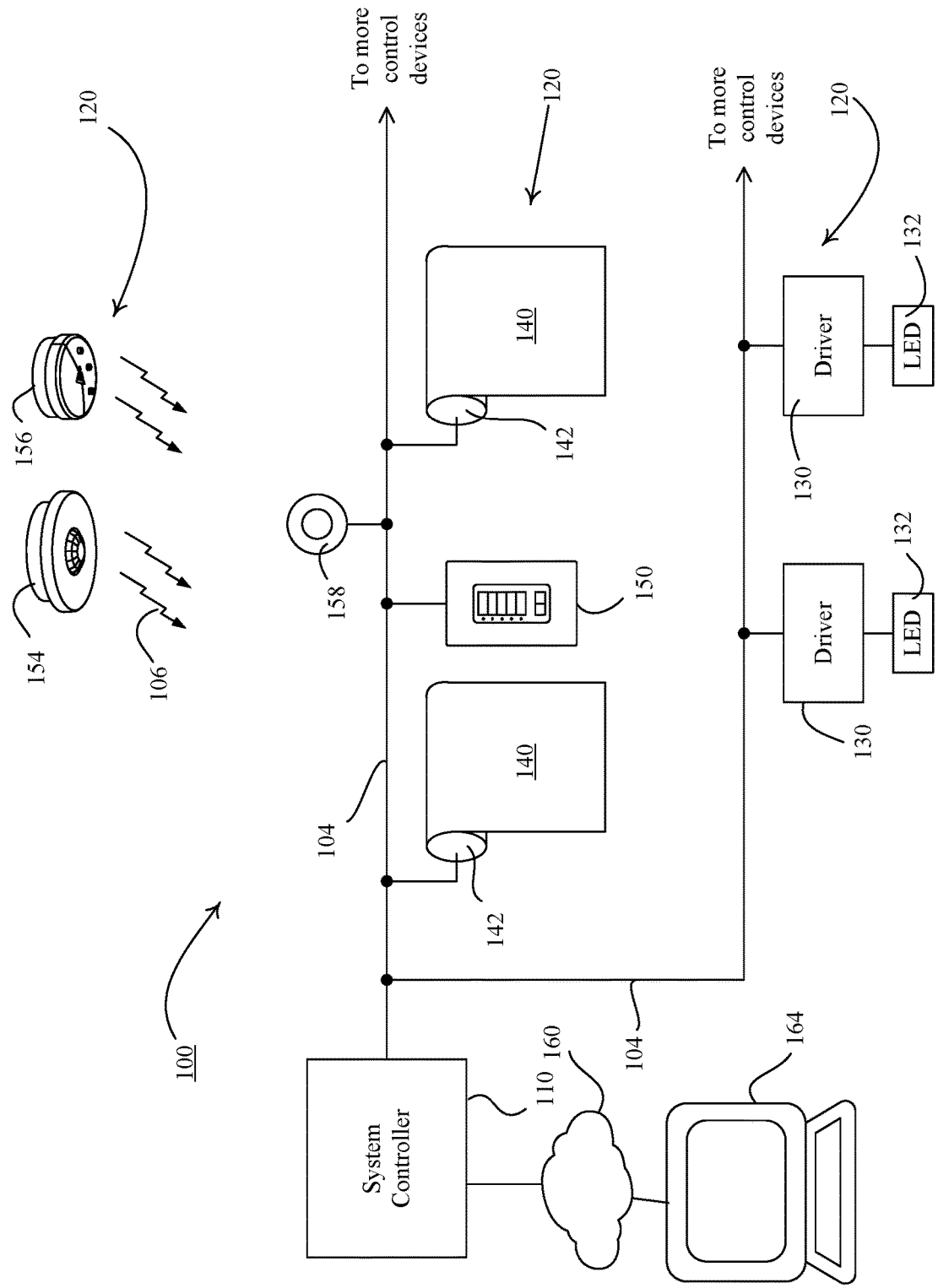
FIG. 1 is a system diagram that illustrates an example load control system that includes control devices.

FIG. 1 shows a high-level diagram of an example load control system 100 for controlling one or more electrical loads in a user environment (also referred to herein as a load control environment). Example user environments may include one or more floors of a building, one or more floors of several buildings, rooms of a hotel, etc. As one example, load control system 100 may enable the automated control of lighting systems, shades, and heating, ventilating, and air conditioning (HVAC) systems in the user environment, among other electrical loads. The load control system 100 may also allow a user to control and monitor the user environment including, for example, over-riding automated settings, determining occupancy at one or more locations in the environment, determining power/energy usage at one or more locations in the environment, determining error conditions with electrical loads in the user environment, etc.

The load control system 100 may include a system controller 110 and a number of control-source devices and a number of control-target devices (collectively designated as elements 120 in FIG. 1 and referred to in general as control devices). The system controller 110, the control-source devices, and the control-target devices may be configured to communicate (directly or indirectly) via one or more communication links 104, which may be wired communication links (although wireless communication links, or some combination thereof may also be used). Communication links 104 may be digital communication links, for example. The system controller 110, the control-source devices, and the control-target devices may be assigned unique addresses or identifiers (ID) on the communication links 104 and may be configured to use these addresses to transmit and/or receive digital messages (messages may include, e.g., commands to perform operations, queries for information, status messages, response messages, etc.) between each other via the communication links 104.

The control-source devices may include, for example, input devices that are operable to detect conditions within the user environment (e.g., user inputs, occupancy/vacancy conditions, changes in measured light intensity, and/or other input information), and to transmit digital messages on a communication link 104 in response to the detected conditions. The control-target devices may include, for example, load control devices operable to receive digital messages, for example, on communication links 104 and to control respective electrical loads in response to the received digital messages. A single control device of the load control system 100 may operate as both a control-source device and a control-target device. According to one example, the system controller 110 may be configured to receive the digital messages on communication links 104 transmitted by the control-source devices, may interpret these messages based on a configuration of the system, and may then transmit digital messages on communication links 104 to the control-target devices for the control target devices to then control respective electrical loads (although one will recognize that a control-source device may also directly communicate with a control-target device). The system controller 110 may also run time-clock applications that automatically adjust loads in the load control system based on time of day and day of year for example. In this fashion, the system controller 110, the control-source devices, and the control target devices may enable the automated control of electrical loads in the load control system. The system controller 110 may also be configured to communicate messages directly with control-source devices and control-target devices to, for example: over-ride automated settings based on user input from a user at network device 164, to reconfigure control-source devices and control-target devices, to determine status information of control-source devices and control-target devices such as error conditions and power levels, etc. The system controller 110 may also determine power usage and occupancy conditions within the user environment based on information communicated with control-source devices and control-target devices. These are merely examples and other examples are possible. One example of a system 100 is Lutron's Quantum® system.

As one example of a control-target device, the load control system 100 may include one or more drivers, such as light-emitting diode (LED) drivers 130 for driving respective LED light sources 132 (e.g., LED light engines). The LED drivers 130 may be in the lighting fixtures of the respective LED light sources 132. The LED drivers 130 may have addresses on respective communication links 104 and may be configured to transmit and/or receive digital messages to and from the system controller 110 via the communication links 104. The LED drivers 130 may be configured to control the respective LED light sources 132 in response to received digital messages and may also be configured to monitor the status of the respective LED light sources 132 and to transmit digital messages to the system controller reporting the status. The LED drivers 130 may alternatively be coupled to a separate communication link (not shown), such as an Ecosystem® or digital addressable lighting interface (DALI) communication link and the load control system 100 may include a digital lighting controller coupled between the communication link 104 and the separate communication link. The load control system 100 may include other types of lighting load control devices, such as, for example, electronic dimming ballasts for driving fluorescent lamps.

As another example of a control-target device, the load control system 100 may include daylight control devices, e.g., motorized window treatments, such as motorized roller shades 140. The load control system 100 may utilize the daylight control devices to control the amount of daylight entering the user environment in which the load control system 100 is installed. Each motorized roller shade 140 may include an electronic drive unit (EDU) 142. The electronic drive unit 142 may be located inside a roller tube when the daylight control device is a motorized roller shade. The electronic drive units 142 may have addresses on the communication links 104 and may be configured to transmit and receive digital messages on the links. The electronic drive units 142 may be configured to adjust the position of a window treatment fabric in response to digital messages received from the system controller 110 via the communication link. The load control system 100 may include other types of daylight control devices, such as, for example, a cellular shade, a drapery, a Roman shade, a Venetian blind, a Persian blind, a pleated blind, a tensioned roller shade systems, an electrochromic or smart window, or other suitable daylight control device.

The load control system 100 may also include one or more other types of control-target devices that may have addresses on the communication links 104 and may be configured to transmit and/or receive digital messages with the system controller 110 via the communication links. For example, such other devices may include a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; hydraulic valves for use in radiators and radiant heating systems; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and/or an alternative energy controller, etc.

With respect to control-source devices, the load control system 100 may include keypad devices 150, occupancy sensors 154, and/or daylight sensors 156, for example, that may have addresses on the communication links 104 and that may be enabled to transmit and/or receive digital messages with the system controller 110. The keypad devices 150, for example, may be configured to transmit digital messages to the system controller 110 via the communication link 104 in response to an actuation of one or more buttons of the keypad device. In response to the messages, the system controller 110 may be configured to transmit one or more digital messages to the load control devices (e.g., the LED drivers 130, and/or the motorized roller shades 140) to control the control devices.

The occupancy sensor 154 may be configured to detect occupancy and/or vacancy conditions in the user environment in which the load control system 100 is installed. The occupancy sensor 154 may transmit digital messages to the system controller 110 in response to detecting occupancy and/or vacancy conditions. The system controller 110 may be configured to turn one or more of the LED light sources 132, for example, on and off in response to receiving an occupancy message and a vacancy message, respectively. The occupancy sensor 154 may operate as a vacancy sensor, such that the lighting loads are turned off in response to detecting a vacancy condition (e.g., but not turned on in response to detecting an occupancy condition). The occupancy sensor 154 may be a wired device that is directly coupled to the communication link 104. Alternatively, as shown in FIG. 1 the occupancy sensor 154 may be a wireless device that transmits wireless messages via RF (radio frequency) signals 106, for example. Here, the load control system 100 may further include a wireless adapter device 158 coupled to the communication link 104. The wireless adapter device 158 may be configured to receive RF signals 106 and to transmit digital messages to the system controller 110 via the communication link 104 in response to the wireless messages from the occupancy sensor.

The daylight sensor 156 may be configured to measure a total light intensity in the user environment in which the load control system 100 is installed. The daylight sensor 156 may transmit digital messages including the measured light intensity to the system controller 110. In response to the measured light intensity, the system controller 110 may communicate one or more digital messages to the LED light sources 132 for controlling the intensities of the lights. Again, the daylight sensors 156 may be wired or wireless devices.

The load control system 100 may include one or more other types of control-source devices that may have addresses on the communication links 104 and may be configured to transmit and/or receive digital messages with the system controller 110. For example, the load control system may include temperature sensors, humidity sensors, radiometers, glare sensors, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, audio-visual controls, safety devices, power monitoring devices (e.g., power meters, energy meters, utility submeters, utility rate meters, etc.), etc.

Again, one will recognize that load control system 100 may include other types of control devices, including devices that may be configured to directly communicate without the need of the system controller 110.

In addition to communication links 104, the system controller 110 may also be configured to communicate via one or more wireless and/or wired networks 160 to communicate with external devices and systems. As one example, the system controller 110 may act as a web-based server and provide web-based services to users through network devices 164 (one example network device is shown in FIG. 1) in use by the users (although one will recognize that system controller 110 may provide services to users in other fashions, such as supporting applications directly executed by network devices 164). Network devices 164 may be, for example, any of a smart phone (e.g., an iPhone® smart phone, an Android® smart phone, or a Blackberry® smart phone), a personal computer, a laptop, a tablet device, (e.g., an iPad® hand-held computing device), etc. In this fashion, system controller 110 may provide a user with access to the load control system 100. Through such a service, a user may interact with the load control system 100 including for example, determining the configuration of the load control system (such as determining for a given room or floor within a user environment what control-source devices and what control-target devices are in that room or floor), over-riding automated settings of control-source devices and control-target devices for the given room or floor, determining occupancy at one or more locations for given room or floor, determining energy usage for the given room or floor, determining error conditions with electrical loads for the given room or floor, etc. One will recognize that system controller 110 may provide other services to a user.

Figure 2:
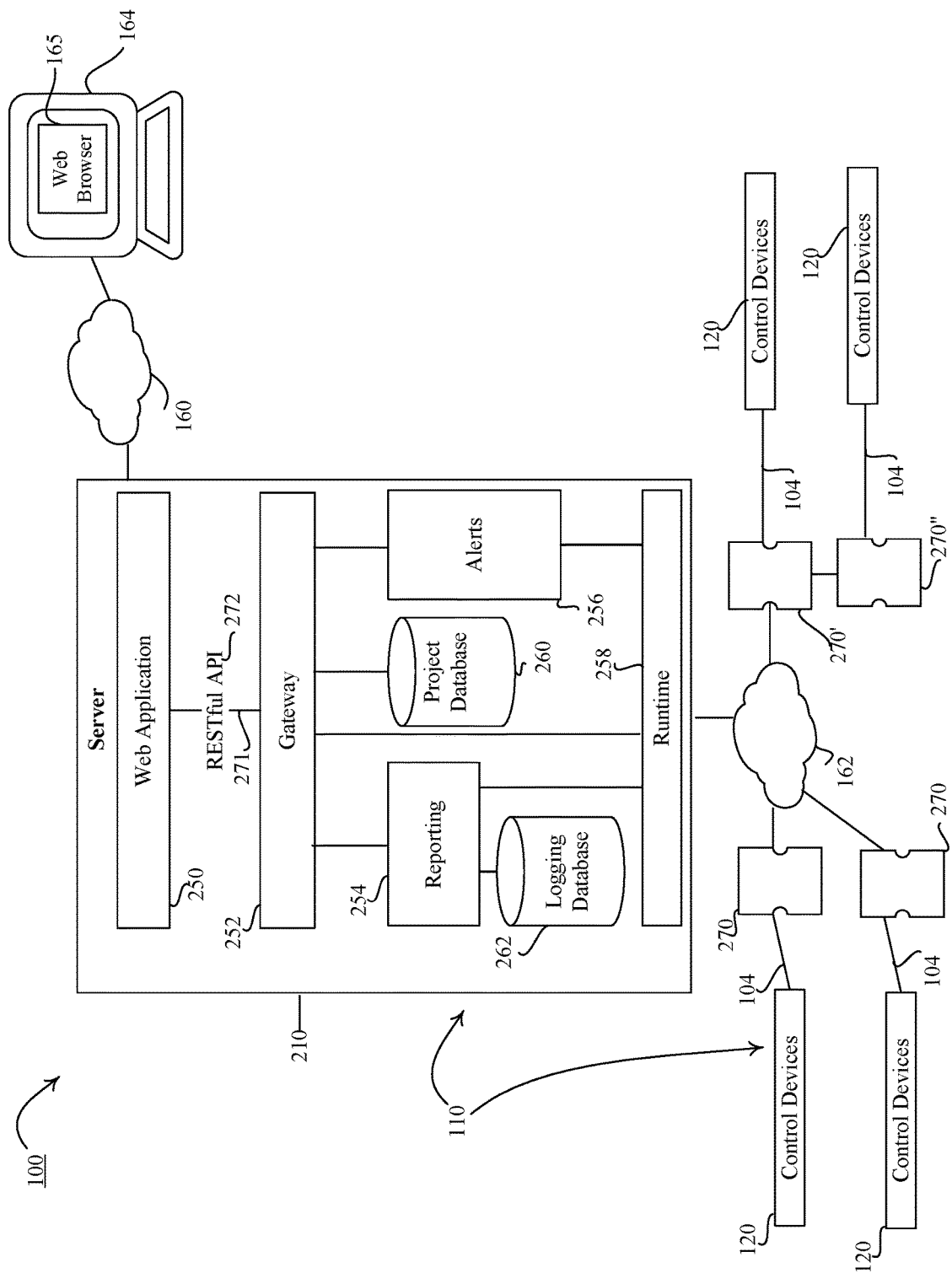
FIG. 2 is a system diagram that illustrates a more detailed example representation of the load control system of FIG. 1.

Referring now to FIG. 2, a more detailed example of load control system 100 is shown. One will recognize that other examples are possible. As shown, system controller 110 may include a server/computing server 210 and a plurality (two or more) of processors 270, which will be referred to herein as Q-processors for description purposes only. Server 210 may include one or more general purpose processors, special purpose processors, conventional processors, digital signal processors (DSPs), microprocessors, microcontrollers, integrated circuits, programmable logic devices (PLD), field programmable gate arrays (FPGA), application specific integrated circuits (ASICs), or any suitable controller or processing device or the like (not shown) (hereinafter collectively referred to as processor(s)), for example. The processor(s) of server 210 may be configured to execute one or more software-based applications that include instructions that when executed by the processor(s) may configure the processor(s) to perform signal coding, data processing, input/output processing, or any other function that enables the server 210 to perform as described herein. Once executed, the applications may provide a plurality of software-based modules including for example, modules 250-258, which are further described below. Modules 250-258 may execute as one or more software-based processes, for example. Nonetheless, one will recognize that features and processes described herein may also and/or alternatively be provided by firmware and/or hardware in addition to and/or as an alternative to software-based instructions and processes. Server 210 may also include one or more memory modules/devices (including volatile and non-volatile memory modules/devices) that may be communicatively coupled to the processors. The memory modules/devices may be implemented as one or more external integrated circuits (IC) and/or as one or more internal circuits of the processor(s). The one or more memory modules/devices may store the software-based applications and may also provide an execution space as the processors execute the applications. Server 210 may also include one or more communication interfaces/transceivers/network interface devices (not shown) communicatively coupled to the processors and/or memory device/modules. The communication interfaces may allow server 210 to communicate over one or more wired and/or wireless communication networks including networks 160 and 162. As one example, the communication interfaces may allow server 210 to communicate over one or more Ethernet based networks. Server 210 may also include one more database management systems for providing databases 260 and 262 as further described herein. These databases may be flat databases, relational/SQL databases, NoSQL/non-SQL databases, and/or a time series databases, etc., although any form of database(s) may be used. Server 210 may also include one or more user interfaces such a display monitor, keyboard, mouse, speakers, audio receivers, etc. While server 210 is shown and described as a single system, server 210 may also be a distributed system with modules 250-258 executing on different servers and communicating over communication networks. Similarly, if load control system 100 were to include database management systems, such database management systems may execute on servers other than server 210. While server 210 is shown as having example modules 250-258 and example databases 260-262, one will recognize the server may include fewer, other and/or additional modules and databases.

Each Q-processor 270 may be, for example, an embedded computing system, that includes one or more processors as similarly described above (not shown), for example, and configured to execute one or more software-based applications that include instructions that when executed by the processor(s) may configure the processor(s) to perform signal coding, data processing, input/output processing, or any other function that enables the Q-processor to perform as described herein. These functions may execute as one or more software-based processes, for example. Nonetheless, one will recognize that features and processes described herein of the Q-processors may also and/or alternatively be provided by firmware and/or hardware in addition to and/or as an alternative to software-based instructions and processes Each Q-processor may also include one or more memory modules/devices (including volatile and non-volatile memory modules/devices) that may be communicatively coupled to the processors of the Q-processors. The memory modules/devices may be implemented as one or more external integrated circuits (IC) and/or as one or more internal circuits of the processor(s). The one or more memory modules/devices may store the software-based applications or firmware and may also provide an execution space as the processors execute the applications. Each Q-processor may also include one or more communication interfaces/network interface devices/transceivers (not shown) communicatively coupled to the processors and/or memory device/modules. The communication interfaces of a Q-processor may allow the Q-processor to communicate over one or more wired and/or wireless communication networks including network 162. The communication interfaces of a Q-processor may also allow the Q-processor to communicate over one or more communication links 104 with control-source devices and control target devices of the load control system 100 (shown as control devices 120 in FIG. 2).

With more specific reference to the Q-processors 270, each Q-processor may interface to one or more communication links 104. Each communication link of a given Q-processor may have connected thereto one or more control-source devices and one or more control-target devices 120. Each control-source device and each control-target device on a given communications link 104 of a Q-processor may be configured to have a unique address or identifier on the link that enables the Q-processor to uniquely identify and communicate with that control device (and possibly for the control devices to communicate with each other) by transmitting and receiving messages with the control devices (again, messages may include, e.g., commands to perform operations, queries for information, status information messages, response messages, etc.). As an example, the address/identifier may be a binary based address (i.e., 1's and 0's), although other address formats may be used. As one example, the address may contain multiple parts, such as a first part that identifies the type of control device (e.g., occupancy sensor, daylight sensor, driver, shade, etc.) and a second part that includes a unique identifier of the device. Each Q-processor may also have a connection via network 162 with server 210 and in particular with one or more modules of server 210, such as Runtime 258, as further described below. This connection may be a bi-directional UDP or TCP connection that allows for communications between the Q-processor and server 210. As another example, multiple Q-processors may be communicatively coupled together with one Q-processor having a connection via network 162 with server 210 and relaying messages for the other Q-processors (as shown by Q-processors 270' and 270").

Depending on the user environment, each Q-processor may be associated with a floor of a building, controlling the control-source devices and control-target devices for that floor. As another example, such as in a hotel, each Q-processor may be associated with a room of the hotel, controlling the control-source devices and control-target devices for that room. Other configurations are possible. In general, the Q-processors may be physically located in the user environment that they control.

Each Q-processor may be an autonomous system that may be configured by an administrator according to a desired operation of the load control system 100. In other words, based on the desired operation of the load control system, each Q-processor may be configured to control its respective control devices in accordance with the overall desired operation. Once configured, a Q-processor and its associated control devices on its respective communication link(s) 104 may not require interaction with the server 210 to operate. The software applications, for example, executing on each Q-processor may be configured by an administrator to perform a number of functions on the control devices associated with the Q-processor. For example, the Q-processor may receive messages from control-source devices (e.g., daylight reading) on its communication links, and based on the messages and configuration of the system, communicate messages to control-target devices (e.g., change light level) on its links. Again, these messages may each include the unique address or identifier assigned to the respective control devices. The Q-processor may also communicate to server 210 over network 162 the messages it receives from and/or the messages it communicates to control devices, thereby providing the server 210 with the current state (light level, shade level, heating level, occupancy detected, vacancy detected, glare level, light intensity level, temperature/HVAC levels, etc.) of the control devices. All such messages communicated by the Q-processor may include the unique address of the control-source devices and/or control target devices. The Q-processor may also execute a time-clock function and based on day, time of day, and a configuration of the load control system 100 for example, may communicate messages to control-source devices and/or control-target devices to change configurations (e.g., change light levels based on time of day). Again, messages communicated to control-source devices and/or control-target devices in this manner may also be communicated by the Q-processor to server 210 over communications network 162 thereby providing the server with the current state of the control devices. The Q-processor may also receive status information from the control-source devices and control-target devices on its links 104. This information may include error conditions, which information may also be communicated by the Q-processor to server 210 over network 162. This information may include occupancy/vacancy conditions, which information may also be communicated by the Q-processor to server 210 over network 162. The Q-processor may also determine energy or power consumption of a given load and periodically report this information to server 210 over network 162. The Q-processor may also receive messages from server 210 over network 162, such as a change to the time-clock operation, a change to a configuration of a control-source or control-target device, or a command to turn a light on/off or to raise or lower a shade, etc. A user may initiate such commands from network device 164. Again, like information communicated by the Q-processor to the server 210, messages received from server 210 may also include the unique address(es) of the control device(s) to which the message is directed. One will recognize that the Q-processors may provide other, additional, and/or fewer functions. In general, the Q-processors may be configured to communicate messages as described herein with control devices and with the server 210 using a well-defined command/response/messaging protocol. Such a protocol may include, for example, one or more messages as described in the Lutron Integration Protocol (http://www.lutron.com/TechnicalDocumentLibrary/040249.pdf), the contents of which are hereby incorporated by reference in their entirety.

With more specific reference to server 210, it may include a number of functional modules (such as Web Application 250, Gateway 252, Runtime 258, Reporting 254, and Alerts 256) and a number of databases (such as Project Database 260, and Logging Database 262). One will recognize that the server 210 may include other, fewer, and/or additional functional modules and databases. Each functional module may be provided as one or more software-based applications and may execute on/by processor(s) of server 210 as one or more software-based processes. One will recognize that the services/functions provided by these example modules may be provided in other ways and described functions of a given module may be performed by other modules and processes.

Beginning with Project Database 260, it may contain a complete definition (as defined/provided by a system administrator, for example) of the load control system 100 for a given user environment. It may contain entries for each of the control-source devices and control-target devices 120 in the load control system 100 including (i) the unique addresses assigned to each control device on its respective communications link 104 as discussed above, (ii) which Q-processor controls the control device, (iii) properties of these control devices, and configuration parameters for these properties that may describe how these devices are to operate in the load control system as defined by the administrator. The Q-processors may use this information in configuring the control devices. The Project Database 260 may also include a definition of the user environment as defined by a system administrator, for example. For example, the database may define the user environment as having a number of floors, with each floor having a number of zones and/or offices. The database may also describe which specific control devices are on each floor and in a given zone or room, for example. For a hotel, for example, it may define a number of floors, which hotel rooms are on a floor, and which specific control devices are in each room. Project Database 260 may be configured as any type of database such as a relational/SQL database, although other configurations may be used, such as a flat database structure, NoSQL database structure, etc. as described herein.

According to one aspect of load control system 100, server 210 may be based on a REST (Representational State Transfer) architecture. According to the REST architecture, the load control system 100 for a given user environment may be viewed as a set of resources (as that term is used in RESTful architectures). As to what constitutes a resource for a given load control system 100 may be flexible in that it may depend on the actual user environment being controlled and the services load control system 100 is providing in this environment to a user at network device 164. For example, in the case of an office building, each control-source device and each control-target device may be viewed as a resource. Similarly, each floor of the building may be viewed as a resource, each office in the building may be viewed as a resource, each conference room may be viewed as a resource, etc. The building may also be viewed as areas or zones and as such, each area or zone may be viewed as a resource. In the context of a hotel, for example, in addition to each control-source device and each control-target device being viewed as a resource, each floor and each hotel room may be viewed as a resource. The services provided by server 210 to a user at network device 164 may be based on operations performed on the defined resources.

In accordance with the REST architecture, each defined resource for a given load control system 100 may have one or more uniform resource identifiers (URI) associated with it. For example, assuming a given load control system 100 has multiple occupancy sensors and daylight sensors (each being a resource), each may be assigned/associated with an URI as shown in Table 1.

TABLE 1

/sensors/occupancy_sensors/Occupancy-Sensor-ID#1
(where ID#1 refers to a specific occupancy sensor)
/sensors/occupancy_sensors/Occupancy-Sensor-ID#2
(where ID#2 refers to another occupancy sensor)
/sensors/daylight_sensors/Daylight-Sensor-ID#1
(where ID#1 refers to a specific daylight sensor)
/sensors/daylight_sensors/Daylight-Sensor-ID#2
(where ID#1 refers to another daylight sensor)

As another example, assuming the load control system 100 has multiple drivers (each being a resource) driving different LED light sources, each driver may be assigned associated with an URI as shown in Table 2.

TABLE 2

/drivers/Driver-ID#1 (where ID#1 refers to a specific driver)
/drivers/Driver-ID#2 (where ID#2 refers to another driver)

As a further example, each floor and/or office of the user environment the load control system 100 is controlling may be viewed as a resource and may be assigned/associated with an URI shown in Table 3.

TABLE 3

/floors/Floor#1 (where Floor#1
refers to a first floor of a building)
/floors/Floor#2 (where Floor#2
refers to a second floor of a building)
/offices/Office#3 (where Office#3
refers to a third office possibly on a
first floor of a building)
/offices/Office#4 (where Office#4
refers to a fourth office possibly on a
second floor of a building)

Similarly, each resource may also have additional URI(s) assigned/associated with it based on other URIs (such as location) to show its relation to the other resources. For example, Table 4 shows an example using location.

TABLE 4

/floors/Floor#1/offices/Office#3
/floors/Floor#2/offices/Office#4
/floors/Floor#1/offices/Offices#3/
sensors/occupancy_sensors/Occupancy-Sensor-ID#1
/floors/Floor#2/offices/Offices#4/
sensors/daylight_sensors/Daylight-Sensor-ID#1
/floors/Floor#1/offices/Offices#3/
drivers/Driver-ID#1

Again, these are merely examples. Project Database 260 may store for each resource a representation (as that term is used in a RESTful architecture), its one or more URIs and in the case of control devices, its relation to the Q-processor that controls the devices and the address on communications link 104 used to access the device. In another aspect, Project Database 260 may not include one or more URIs for a resource but may be configured such that as a module, such as Gateway 252, interfaces with the database, Gateway 252 may form/determine a URI(s) for a resource. One will recognize other configurations are possible. For a control device type resource, its representation may contain parameters on that resource and values for the parameter. For example, for a shade control device or light control device type resource, the representation of these resources may include the current setting of the shade or light respectively and its location (floor and office, for example). Alternatively, each representation may contain the URI of the floor and office, for example, on which the shade or light is located and or information to form the URI. Again, these are merely examples.

Turning now to modules 250-258 of server 210, Runtime 258 may function as an interface between server 210 and the Q-processors and in particular, may maintain communication connections with the Q-processors via network 162. Again, these connections may be UDP or TCP bi-directional connections, for example. In this fashion, Runtime 258 may function as a router, routing data/information/messages from the Q-processors to various modules within the server 210, and routing data/information/messages from various modules within the server 210 to particular Q-processors. Runtime 258 may also function as a translator, translating message and information formats, for example, between the Q-processors and modules of the server 210. For example, Runtime 258 may receive data from the Q-processors. As indicated above, such information may include state information of the control devices (e.g., light level, shade level, HVAC level), error conditions, and power consumption. Runtime 258 may maintain the current state of the devices and the power consumption levels, for example. Runtime 258 may also aggregate some information, such as power consumption for a given room or floor. Runtime 258 may also communicate with Reporting 254, sending to it any or at least portions of information it receives from the Q-processors including any state information and error conditions, and may send to it any power consumption determinations, etc. Reporting 254 may communicate with Runtime 258 to specify the types of information that Runtime 258 should forward to it. Runtime 254 may also communicate with Alerts 256, communicating any error conditions, for example, reported by the Q-processors. Alerts 256 may communicate with Runtime 258 to specify the types of errors that Runtime 258 should forward to it. Prior to communicating information to Reporting 254 or Alerts 256, Runtime 258 may perform data conversions or translations including, for example, converting the unique address of a control device used on communications link 104 to the device's URI(s) and/or associating the communicated information with the device's particular URI(s). Runtime 258 may also communicate with Gateway 252. As an example, Runtime 254 may receive messages from the Gateway 252 such as changes to time-clock operations, changes to configurations of control-source devices and/or control-target devices 120, or commands to turn lights on/off or to raise or lower shades, etc. Such commands may be initiated by a user from network device 164. Runtime 258 may translate the messages into a format understood by the Q-processors, route the messages to the appropriate Q-processor(s), and assuming the messages are directed at a particular control device, translate a URI address to the unique address of the device used on communications link 104. As another example, Runtime 258 may receive messages from Gateway 252 that Runtime can directly respond to, such as the current state of a control device or current power consumption. Runtime 258 may also communicate messages directly to Gateway 252 as a result of messages received from the Q-processors. Again, communications from Runtime 258 to Gateway 252 may use the URI of relevant devices for example. Other variations are possible.

Reporting 254 may interface with Runtime 258, as indicted above, and may store all or portions of the data it receives from Runtime in Logging Database 262. Logging Database 262 may be configured as any type of database such as a relational/SQL database, although other configurations may be used, such as a flat database structure, NoSQL database structure, etc. as described herein. Reporting 254 may also communicate with Gateway 252. Through this interface with the Gateway 252, Reporting 254 may receive requests for certain reports (which requests may be initiated by a user from network device 164, for example), use data from Logging Database 262 to generate the reports, and then communicate the reports to Gateway 252, which may them forward the reports to the user through Web Application 250.

Alerts 256 may interface with Runtime 258, as indicted above, and may receive error conditions, for example, as reported by Q-processors 270. Alerts 256 may also communicate with Gateway 252. Through this interface, Gateway 252, at the request of a user from network device 164 for example, may request notification of any or certain errors within the system 100. As Alerts 256 receives error conditions from Runtime 258, it may report these errors to Gateway 252, which may then report the errors to the user at network device 164 through Web Application 250.

Referring now to Web Application 250 and Gateway 252, the Web Application may act as a web-based server and provide web-based services to a user through a network device 164 via network 160. Using a web browser/web interface 165 on network device 164 for example, a user may access Web Application 250 using a standard URL (Uniform Resource Locator). These services provided by the Web Application may include, for example, requests by the user for an indication as to the configuration of the load control system 100 with respect to the user environment being controlled (e.g., floors, offices, control devices within offices, etc. that make of the user environment), requests to control or configure control devices (e.g., turn a light on/off, raise/lower a shade), requests to reconfigure time-clock configurations, requests for error conditions, requests for reports (such as occupancy and power consumption), etc. The Web Application may provide such services by interacting with the Gateway 252 through a communications interface/connection 271 using an API (application programming interface) 272 provided by the Gateway. This API may be a RESTful API (i.e., an API that operates on resource representations, as identified by an URI as discussed herein) and may be based upon, for example, HTTP (hypertext transfer protocol) and use standard HTTP methods, such as GET, PUT, POST, DELETE, etc. Nonetheless, one will recognize that API 272 may be any RESTful API that supports basic operations such as Create, Read, Update, and Delete. The API may also support Subscribe Request operations. For description purposes only, Create, Read, Update, and Delete will be used herein. API 272 may include operations that can be performed on the defined resources of the load control system 100 and in particular, may provide operations based on the URIs of the resources. For example, the Web Application (based on a service being provided to a user via network device 164) may issue a Read based message to the Gateway 252, which may result in the Gateway passing back to the Web Application 250 one or more messages (e.g., responses) that include URIs of respective resources. Similarly, the Web Application may issue Read, Create, Update, and/or Delete based messages, for example, to the Gateway indicating one or more URIs of respective resources the message relates to. In response, the Gateway may operate on the designated resource(s) and pass back to the Web Application message(s) that contain information on the resource(s).

Accordingly, as a user accesses the Web Application 250 using network device 164, the Web Application may provide the user via the network device web pages (e.g., Graphical User Interfaces (GUIs)) that include a set of services that allow the user to interact with the load control system 100. As the user makes these requests, Web Application 250 may provide the service to the user by issuing one or more messages to Gateway 252 using the API 272 provided by the Gateway (again, messages may include, e.g., commands to perform operations, queries for information, status information messages, response messages, etc.). These messages may be formatted/based on the API 272 the Gateway 252 provides to the Web Application 250. The Gateway 252 may in turn function as a router and translator based on the messages. For example, as the Gateway 252 receives a message from the Web Application 250, it may determine where it needs to route that message, such as to Reporting 254, Runtime 258, the Project Database 260, and/or Alerts 256. The Gateway 252 may also need to translate the message from the API 272 used by Web Application 250 into a format understood by the modules and databases 254-262. For example, the Gateway may translate the messages from a format corresponding to API 272 to an internal format used by the server 210 and may translate commands, e.g., of the API to commands used by the system. Similarly, as the Gateway 252 receives information, e.g., from Reporting 254, Runtime 258, the Project Database 260, and/or Alerts 256, it may need to translate that information to a format corresponding to API 272, for example, and communicate the information to the Web Application 250 for processing according to the offered services and subsequent presentation to the user.

Because sever 210 may be based on a RESTful architecture, the initial interaction by the network device 164/user of the device to the Web Application 250 may result in the Web Application initially issuing a discovery or query type command (e.g., Read) to the Gateway 252 (based on a particular service being offered by the Web Application) to determine/discover resources within the load control system that the Web Application can operate on. In response to that initial request by the Web Application 250, the Gateway 252 may provide indications of resources to the Web Application

250 using the respective resources' URIs. The Web Application 250 may in turn provide the URIs to the network device 164/user, which the network device/user may continue to use thereafter to communicate with the Web Application 250. In other words, in accordance with the RESTful architecture, the Gateway's presentation of the load control system components (e.g., load control devices) to the Web Application and to the network device/user, and the Web Application's and network device's/user's subsequent interaction with the Gateway may by through resource URIs and operations performed on resources as designated by resource URIs.

In general, while the modules of sever 210 (e.g., Gateway 252, Reporting 254, Runtime 258, and Alerts 256, and Web Application 250) are described herein as executing on one/the same server, the modules and/or databases may execute/reside on any combination of hardware-based servers. When executing on the same server, the modules may communicate using any inter-process communication (IPC) mechanism (e.g., a ".Net Remoting" architecture) for example, and when executing on different servers, may communicate using any remote processing communication mechanism (e.g., remote procedure calls), for example.

Figure 3:
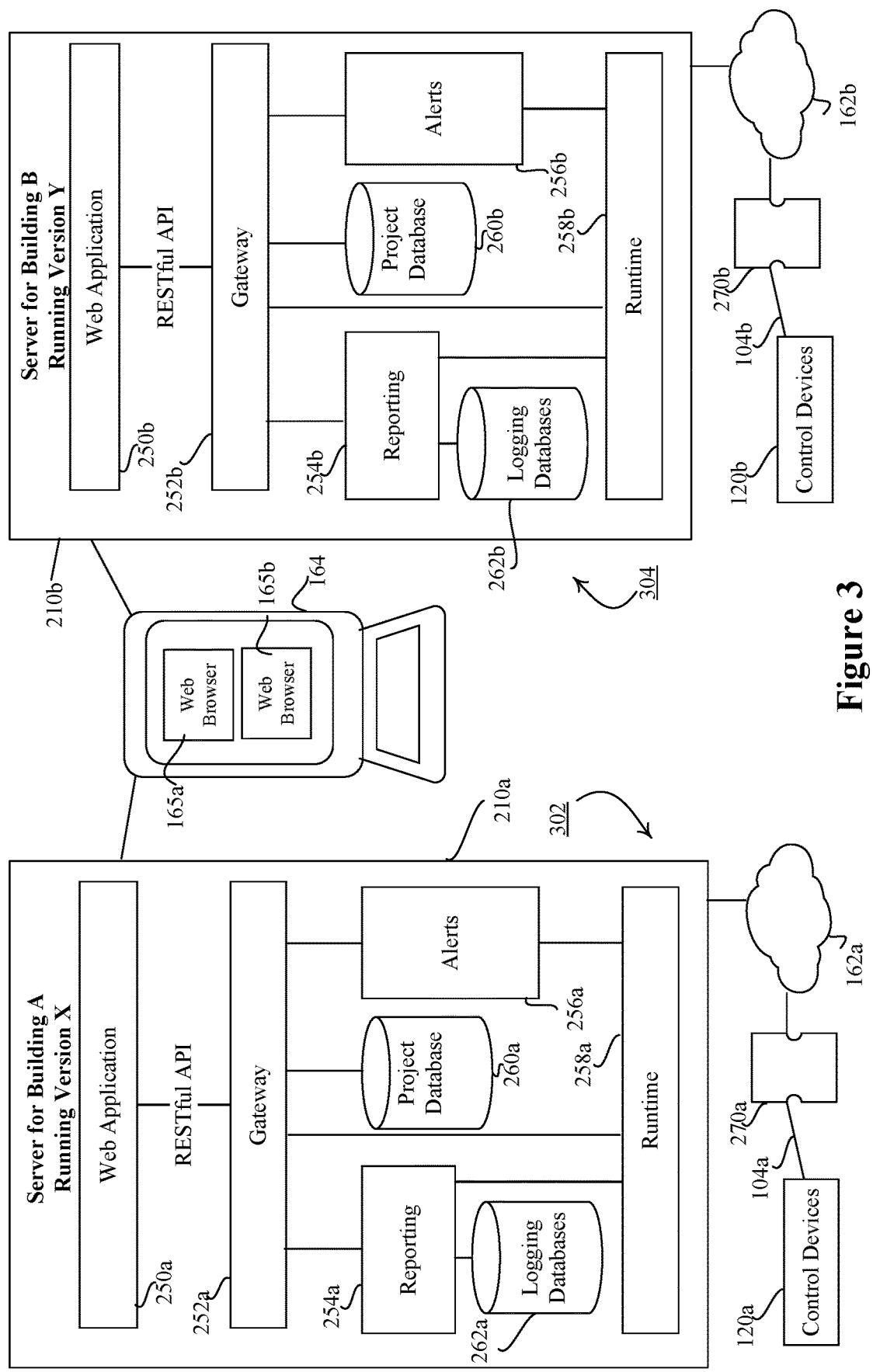
FIG. 3 is a system diagram that shows an example issue with the system shown in FIG. 2.

Referring now to FIG. 3, there is shown an example problem with load control system 100 as shown in FIGS. 1 and 2 (for simplification, only a subset of Q-processors 270 are shown in FIG. 3). As an example of the problem, a user may have two buildings A and B on a single campus. The user may install a load control system 302 in building A at a first time where load control system 302 may operate as system 100 described herein. Load control system 302 may include a server 210*a* that me be similar to server 210, and may include one or more Q-processors 270*a* that me be similar to Q-processors 270 as described herein. At that first time, the load control system 302 may be running a first version of application software, which may be referred to as Version X. Again, the application software may be the software that executes on server 210*a* and/or the Q-processors 270*a*. At a later time, the user may install a load control system 304 in building B where load control system 304 may operate as system 100 described herein. Load control system 304 may include a server 210*b* that me be similar to server 210, and may include one or more Q-processors 270*b* that me be similar to Q-processors 270 as described herein. At this later time, the load control system 304 may be running a second version of software, which may be referred to as Version Y and which may be different from Version X. For example, Version X and Version Y may be different because of bug fixes, new features, etc. Again, the Version Y software may be the software that executes on server 210*b* and/or the Q-processors 270*b*. The user may not desire to update load control system 302 from Version X to Version Y. As a result, the user may now have two independent load control systems that the user needs to interact with independently of the other because the load control systems are on different versions of software. In other words, the user may need to interact with Web Application 250*a* of load control system 302 and also interact with Web Application 250*b* of load control system 304 independently, having two web browsers/interfaces 165*a* and 165*b* open on the network device 164, one for each load control system 302 and 304, switching between the web browsers depending on which building the user wishes to interact with (as shown in FIG. 3, the user may have two web browsers open, one for each system 302/304). In addition to having to deal with multiple load control systems independently, another issue with the example of FIG. 3 is that users may not be able to obtain an aggregate view of the building A-building B campus but rather, must perform that aggregation themselves. As one simple example, a user may desire to know the total power consumption across the campus. Under the example shown in FIG. 3, the user may need to perform this aggregation himself based on information each load control system independently provides. These issues may become worse if the user then installs a third system in a third building, etc. A similar issue may occur if a user installs a load control system at a first time on a first set of floors of a building and then installs a load control system at a second later time on a second set of floors of the building. A similar issue may also occur if a user has multiple buildings that are at diverse geographical locations that the user installs load control systems at different times.

Figure 4:
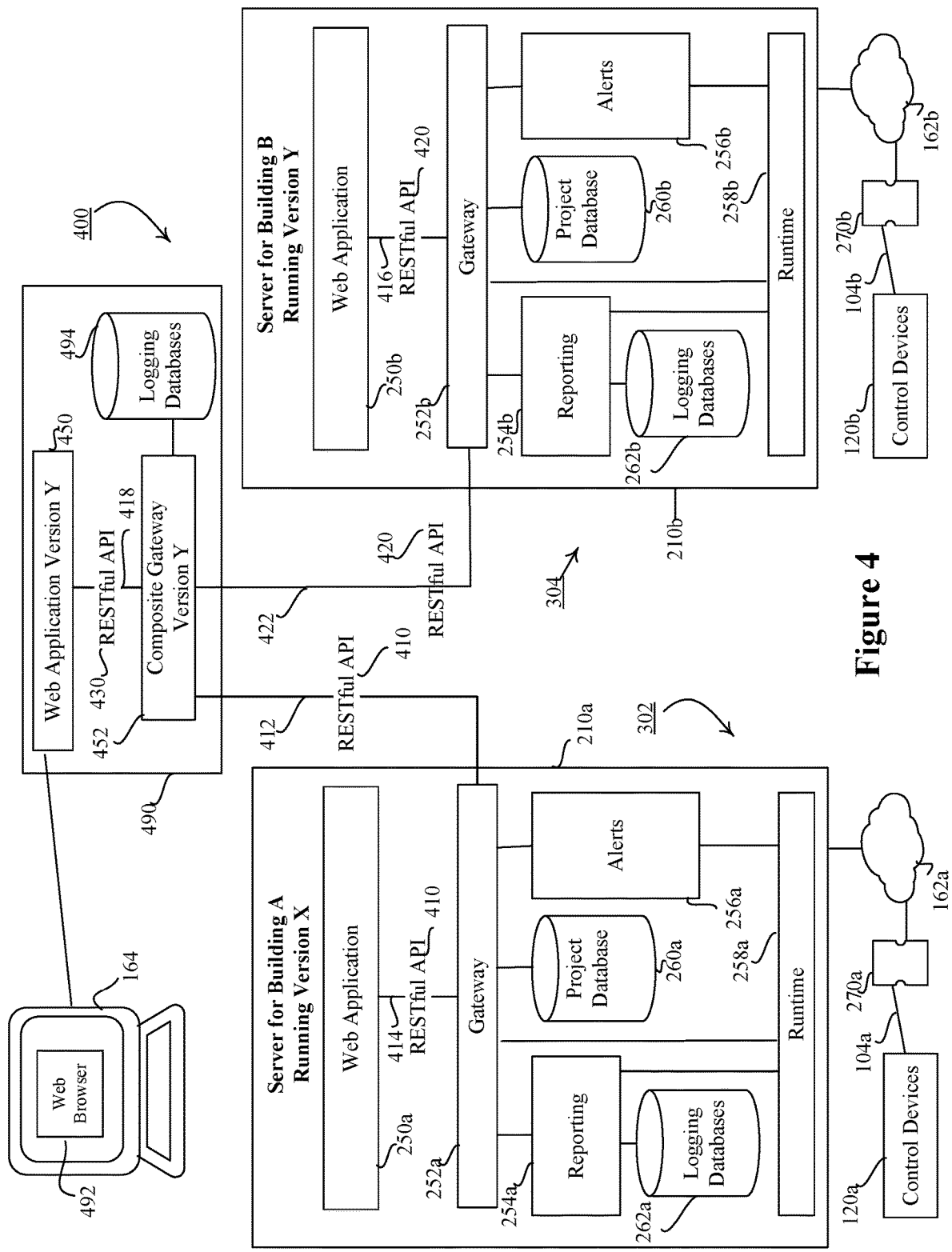
FIG. 4 is a system diagram that illustrates an example load control system.

Referring now to FIG. 4, there is shown an example load control system 400 applied to the building example discussed in FIG. 3. In this example, load control system 400 includes two load control systems, 302 and 304, with load control system 302 corresponding to building A and load control system 304 corresponding to a building B of FIG. 3 (as another example, each load control system may correspond to different floors of a building). Each load control system 302 and 304 may resemble load control system 100 and independently operate as similarly described for load control system 100 as described with respect to FIGS. 1, 2, and 3. Each load control system 302 and 304 may be running the same or different versions of software (FIG. 4 shows the load control system systems on different versions X and Y). Similarly, a network device 164/user may interact with load control systems 302 and 304 independently of the other as described with respect to FIG. 3. In other words, using a network device 164, a user may use a web browser/interface 165*a* and interface with Web Application 250*a* of server 210*a* of load control system 302 and control that load control system. Similarly, using network device 164, the user may use a web browser/interface 165*b* and interface with Web Application 250*b* of server 210*b* of load control system 304 and control that load control system. Nonetheless, neither system 302 nor system 304 needs Web Application 250*a/b* and a user does not necessarily need to interface with either Web Application.

As compared to load control system 100, load control system 400 now includes a server 490 that may be similarly configured as server 210, for example, as described herein. Server 490 may include a Composite Gateway functional module 452 and Web Application functional module 450. Each module may be provided as one or more software-based applications and may execute as one or more software-based processes on processor(s) of server 490 as similarly described herein for the modules of server 210, for example. Nonetheless, one will recognize that the services/functions provided by these example modules 452 and 450 may be provided in other ways (such as hardware and/or firmware-based modules) and certain described functions of a given module may be performed by other modules.

Similar to Web Application 250, Web Application 450 may act as a web-based server and provide web-based services to a user through a network device 164 via a network (not shown). Using a web browser/interface 492 on network device 164 for example, a user may access Web Application 450 using a standard URL. The services provide by Web Application 450 may be similar to the types of services provided by Web Application 250*a* and Web Application 250*b*. However, while Web Application 250*a* may allow a user to control and interact with control devices 120*a* of load control system 302 and while Web Application 250*b* may allow a user to control and interact with control devices 120*b* of load control system 304, Web Application 450 may allow a user to control and interact with both load control systems 302 and 304 at the same time and thus control and interact with both control devices 120*a* and control devices 120*b*. In addition, unlike the example shown in FIG. 3, Web Application 450 may allow a user to interact with both load control systems using one web browser/interface 492. In other words, using Composite Gateway 452 as described below, Web Application 450 may provide a user of network device 164 with a composite view of both load control systems 302 and 304, controlling and interacting with the load control systems as if they were one unified load control system. However, because of Composite Gateway 452, the services provided by Web Application 450 may be designed/configured independently of knowing that there are multiple load control systems 302 and 304 beneath it. Hence, a user of network device 164 may use Web Application 450 to determine the configuration of the load control system 302 with respect to the building A (e.g., floors, offices, control devices within offices, etc. of building A), to determine the configuration of the load control system 304 with respect to the building B (e.g., floors, offices, control devices within offices, etc. of building B), to control or configure control devices (e.g., turn a light on/off, raise/lower a shade) of building A and of building B, to reconfigure time-clock configurations of building A and of building B, to receive error conditions for building A and for building B, to receive reports (such as occupancy and power consumption) for building A and for building B, and in particular, receive information in an aggregated form. For example, Web Application 450 together with the Composite Gateway 452 may allow a user to obtain aggregate reports/information across the campus of building A and building B, such as total power consumption, total occupancy, etc. The Web Application 450 may provide such services by interacting with the Composite Gateway 452 using an API 430 provided by the Gateway.

An administrator may configure Composite Gateway 452 to have a communications interfaces/connections 412 and 422 with Gateway 252*a* of server 210*a*/load control system 302 and with Gateway 252*b* of server 210*b*/load control system 304 respectively. Gateway 252*a* of server 210*a*/load control system 302 and Gateway 252*b* of server 210*b*/load control system 304 may operate like the Gateway 252 as described above with respect to FIG. 2, with the difference that each may be running different versions of software (X vs Y), for example. Gateway 252*a* of server 210*a*/load control system 302 may provide an API 410 to Web Application 250*a* of server 210*a*/load control system 302 through communications interface/connection 414 and may also provide the same API to the Composite Gateway 452 through interface 412. API 410 may be a RESTful API and may be based upon and use standard operations, such as Create, Read, Update, Delete, and/or Subscribe Request, etc. as discussed above with respect to system 100. Again, other examples are possible. API 410 may include operations that can be performed on the defined resources of load control system 302 and in particular, may provide operations based on the URIs of the resources of system load control system 302. Being a REST based architecture, Gateway 252*a* of server 210*a*/load control system 302 may be configured to communicate and interact with Web Application 250*a* of load control system 302 and Composite Gateway 452 in the same fashion, and may interact with both at the same time.

Similarly, Gateway 252*b* of server 210*b*/load control system 304 may provide an API 420 to Web Application 250*b* of server 210*b*/load control system 304 through communications interface/connection 416 and may also provide the same API to the Composite Gateway 452 through interface 422. API 420 may be a RESTful API and may be based upon and use standard operations, such as Create, Read, Update, Delete, and/or Subscribe Request, etc. as discussed above. Again, other examples are possible. API 420 may include operations that can be performed on the defined resources of system 404 and in particular, may provide operations based on the URIs of the resources of load control system 304. Being a REST based architecture, Gateway 252*b* of server 210*b*/load control system 304 may communicate and interact with Web Application 250*b* of server 210*b*/load control system 304 may be configured to and Composite Gateway 452 in the same fashion, and may interact with both at the same time.

According to this example, the Composite Gateway 452, in addition to interacting with Gateway 252*a* of load control system 302 through API 410 and interacting with Gateway 252*b* of load control system 304 through API 420, may also interact with Web Application 450 through an API 430 it provides to the Web Application 450 through communications interface/connection 418. API 430 may be a RESTful API and may be based upon and use standard operations such as Create, Read, Update, Delete, and/or Subscribe Request, etc. as discussed above with respect to system 100. Again, other examples are possible. API 430 may include operations that can be performed on the defined resources of load control system 302 and load control system 304 and in particular, may provide operations based on the URIs of the resources of these systems.

API 430 may be the same as API 410 that Gateway 252*a* provides to the Composite Gateway 452 and may be the same as API 420 that Gateway 252*b* provides to the Composite Gateway. According to another example, the APIs may not be identical. For example, Composite Gateway 452 and Gateway 252*b* may be running the same version of software (as shown in FIG. 4) and as such, API 430 provide by the Composite Gateway 452 may be the same as API 420 provided by the Gateway 252*b*. However, because Gateway 252*a* may be on an earlier version of software, API 410 it provides to the Composite Gateway may be different from API 430 that the Composite Gateway provides to Web Application 450. For example, API 430 provided by the Composite Gateway to Web Application 450 may include additional messages and/or one or more messages may now include additional fields. According to one example, Gateway 252*a* may be configured such that if Composite Gateway 452 communicates an API message to Gateway 252*a* that does not conform to Gateway 252*a*'s API 410, Gateway 252*a* may ignore the message and/or fields of the message that are non-conformant to its API. According to another example, API 430 may be different from API 410 and API 420 and Composite Gateway 452 may act as a translator between these APIs, translating message formats.

Modules 250*a*-258*a* and databases 260*a*-262*a* of load control system 302, modules 250*b*-258*b* and databases 260*a*-262*a* of load control system 304, the Composite Gateway 452, and the Web Application 450 may execute on any combination of hardware-based servers. For example, all modules and databases of load control system 400 may execute on the same server. As another example, the modules and databases of load control system 302 may execute on a first server 210*a*, the modules and databases of load control system 304 may execute on a second server 210*b*, and the Composite Gateway 452 and the Web Application 450 may execute on a third server 490 as shown in FIG. 4, or some combination thereof. As another example, one or more modules and databases of load control system 400 may execute on one or more cloud-based servers. In general, when modules described herein execute on the same server, the modules may communicate using any inter-process communication (IPC) mechanism (e.g., a ".Net Remoting" architecture) for example, and when executing on different servers, may communicate using any remote processing communication mechanism (e.g., remote procedure calls), for example.

Turning now more specifically to Composite Gateway 452 and Web Application 450, according to another aspect of load control system 400 a system administrator, for example, may configure the Composite Gateway to associate communications connection/interface 412 to load control system 302 with building A (or a first set of floors, or to a first zone, etc., depending on the areas load control system 302 is controlling/is installed) and to associate communications connection/interface 422 to load control system 304 with building B (or a second set of floors, or to a second zone, etc., depending on the areas load control system 304 is controlling/is installed). The Composite Gateway 452 may also be configured by a system administrator, for example, to associate each of buildings A and B to, for example, a campus. According to a further aspect of load control system 400, a system administrator may configure Composite Gateway 452 to associate a URI with communications connection/interface 412 to load control system 302 and to associate another different URI with communications connection/interface 422 to load control system 304. For example, Composite Gateway 452 may be configured to associate with connection 412 to load control system 402 any one or more of "/BuildingA", "/buildings/BuildingA", or "/campus/buildings/BuildingA." Similarly, Composite Gateway 452 may be configured to associate with connection 422 to load control system 404 any one or more of "/BuildingB", "/buildings/BuildingB", or "/campus/buildings/BuildingB." Again, these are merely examples.

According to an example operation of load control system 400, as a user accesses the Web Application 450 using network device 164, the Web Application may provide the user with web pages via the network device that include a set of services that allow the user to interact with load control system 400. As the user makes these requests, Web Application 450 may provide the services by issuing messages (e.g., again, messages may include, e.g., commands to perform operations, queries for information, etc.) to and receiving messages from (e.g. response messages) Composite Gateway 452 using API 430 provided by the Composite Gateway. Composite Gateway 452 in turn may function as a router, translator, and data aggregator based on the messages. For example, as the Composite Gateway 452 receives a message from the Web Application 450, it may determine where it needs to route that message, including whether it needs to route the message to Gateway 252a via connection 412 and/or whether it needs to route the message to Gateway 252b via connection 422. Assuming API 430, API 410, and API 420 are the same or substantially the same (i.e., differ by version) as discussed above, the Composite Gateway 452 may forward the message it receives from Web Application 450 on each of interfaces 412 and 422. Routing is further discussed below. As Gateway 252a and Gateway 252b receive the messages, they may operate on the messages as discussed with respect to load control system 100 of FIGS. 1 and 2, for example. As Gateway 252a and Gateway 252b generate response messages, for example, they may each in turn forward the response messages on their respective interfaces 412 and 422 to Composite Gateway 452, using their respective APIs. Composite Gateway 452 may in turn be configured to aggregate the responses from each of Gateways 252a and 252b into one response message, for example, and forward that response message to Web Application 450 for processing according to the offered services and subsequent presentation to the user at network device 164. In aggregating the response messages from each of Gateways 252a and 252b into one response, the Composite Gateway may extract information (Information A) from the response message from Gateway 252a and extract information (Information B) from the response message from Gateway 252b and combine the information to form at least in part the response message forward to Web Application 450 (e.g., the message forwarded to the Web Application may include Information A and Information B). According to another example, the Composite Gateway may be configured to perform operations on Information A and/or Information B to form new Information C that may form at least in part the response message forwarded to Web Application 450. For example, Gateway 252a and Gateway 252b may each forward power measurements to the Composite Gateway (e.g., corresponding to building A and to building B respectively). The Composite Gateway may be configured to combine the power measurements into one value and provide the Web Application 450 with a total power reading across both buildings. Other examples are possible. In general, a response message forwarded from the Composite Gateway 452 to the Web Application 450 may include URIs of resources corresponding just to load control system 302, may include URIs of resources corresponding just to load control system 304, or may include URIs of resources corresponding to load control system 302 and to load control system 304, as further described below. One will also recognize that the Composite Gateway may forward responses received from each of Gateways 252a and 252b as separate messages to the Web Application 450, rather than performing an aggregation of information, or some combination thereof, depending, for example, on the information being communicated. In addition, while messages are described herein as being forwarded from Web Application 450, to Composite Gateway 452, and then to Gateways 252a and 252b (and vis versa), the Composite Gateway may perform translation of messages and data/information formats to conform to each of the interface APIs.

As indicated, messages communicated by Gateways 252a and 252b to Composite Gateway 452 may or may not include URIs of resources controlled by the respective load control systems (depending on the messages issued to the Gateways). When messages do include URIs of resources, Composite Gateway may forward those URIs to Web Application 450, which may also forward the URIs to a web browser 492 at network device 164. Thereafter, based on services being provided by Web Application 450 and requests being made by a user at network device 164, the Web Application 450 may issue messages to the Composite Gateway 452 that includes URIs of resources controlled by load control system 302 and/or load control system 304 and that may result in Gateways 252a and 252b forwarding other resource URIs to the Composite Gateway 452 and thus Web Application 450. Preferably, the initial interactions by a user via network device 164 with Web Application 450 will cause Web Application 450 to communicate a generic search or discovery or query type command/message (e.g., a read based command) to the Composite Gateway, which it will then forward to each Gateway 252a and 252b and that causes each Gateway 252a and 252b to respond to the Composite Gateway with the URIs of one or more resources of load control system 302 and/or load control system 304. Again, Composite Gateway may forward those URIs to Web Application 450, which may also forward the URIs to a web browser 492 at network device 164.

With more specific reference now to routing as performed by Composite Gateway 452, as the Gateway receives URIs of resources from Gateway 252a of load control system 302 over interface 412, the Composite Gateway may amend or translate or transform the URI to include or be associated with the URI the Composite Gateway has been configured to associate with interface 412 (e.g., "/BuildingA", "/buildings/BuildingA", or "/campus/buildings/BuildingA"). For example, Gateway 252a may forward any of the following example URIs shown in Table 5 to the Composite Gateway 452, each URI representing a resource of load control system 302.

TABLE 5

/sensors/occupancy_sensors/Occupany-Sensor-ID#1
/drivers/Driver-ID#1
/floors/Floor#1
/offices/Office#3
/floors/Floor#1/offices/Office#3
/floors/Floor#1/offices/Office#3/
sensors/occupancy_sensors/Occupany-Sensor-ID#1
/floors/Floor#2/offices/Office#3/drivers/Driver-ID#1

In turn, the Composite Gateway 452 may translate each URI to include or be associated with the URI the Composite Gateway has been configured to associate with interface 412. Assuming that URI is "/campus/buildings/BuildingA" for example, it may transform the URIs of Table 5 by adding "/campus/buildings/BuildingA" as a prefix, for example, as shown in Table 6.

TABLE 6

/campus/buildings/BuildingA/sensors/occupancy_sensors/
Occupany-Sensor-ID#1
/campus/buildings/BuildingA/drivers/Driver-ID#1
/campus/buildings/BuildingA/floors/Floor#1
/campus/buildings/BuildingA/offices/Office#3
/campus/buildings/BuildingA/floors/Floor#1/offices/
Office#3
/campus/buildings/BuildingA/floors/Floor#1/offices/
Office#3/sensors/occupancy_sensors/Occupany-Sensor-ID#1
/campus/buildings/BuildingA/floors/Floor#2/offices/
Office#3/drivers/Driver-ID#1

Similarly, as the Composite Gateway 452 receives URI's of resources from Gateway 252b of load control system 304 over interface 422, the Composite Gateway may amend or translate or transform the URI to include or be associated with the URI the Composite Gateway has been configured to associate with interface 422 (e.g., "/BuildingB", "/buildings/BuildingB", or "/campus/buildings/BuildingB"). For example, assuming Gateway 252b of load control system 304 forwards the URIs shown in Table 5 to the Composite Gateway, the Composite Gateway may translate the URI's of Table 5 by adding "/campus/buildings/BuildingB" as a prefix, for example, as shown in Table 7.

TABLE 7

/campus/buildings/BuildingB/sensors/occupancy_sensors/
Occupany-Sensor-ID#1
/campus/buildings/BuildingB/drivers/Driver-ID#1
/campus/buildings/BuildingB/floors/Floor#1

TABLE 7-continued

/campus/buildings/BuildingB/offices/Office#3
/campus/buildings/BuildingB/floors/Floor#1/offices/
Office#3
/campus/buildings/BuildingB/floors/Floor#1/offices/
Office#3/sensors/occupancy_sensors/Occupany-Sensor-ID#1
/campus/buildings/BuildingB/floors/Floor#2/offices/
Office#3/drivers/Driver-ID#1

Once the Composite Gateway translates an URI as shown in example Table 6 or example Table 7, it may forward the translated URI(s) to Web Application 450, which may forward the translated URI(s) to a web browser 492 of network device 164. In other words, from the perspective of Web Application 450 and/or the user/web browser 492 at network device 164, load control system 302 and load control system 304 may appear as one unified load control system having one consistent set of URIs. Again, if the Composite Gateway 452 issues a message to Gateway 252a and Gateway 252b and both Gateways respond to the Composite Gateway with respective URIs, the Composite Gateway may translate the URIs based on which respective interface the URI was received on, aggregate the translated URIs into one response message, and forward the aggregated response to the Web Application 450, which may be forwarded to web browser 492 of network device 164. Again, the Composite Gateway may alternatively forward each response to the Web Application 450 as separate messages but with the respective URIs still being translated as described above.

As a user at network device 164 requests continued services from Web Application 450, the Web Application may forward a message (using API 430) to the Composite Gateway 452 that includes no URIs (e.g., a generic Read message), that includes one or more translated URIs corresponding to load control system 302, that includes one or more translated URIs corresponding to load control system 304, or that includes one or more translated URIs corresponding to load control systems 302 and 304. The Composite Gateway may translate the messages as follows:

Generic Message: The Composite Gateway may determine that the message from Web Application 450 is a generic message (e.g., it does not include any URIs) and therefore forward the message to load control system 302 via interface 412 and to load control system 304 via interface 422.

Message includes URIs from load control system 302: The Composite Gateway may determine that the message from Web Application 450 only includes URIs corresponding to load control system 302 (the Composite Gateway may make this determination based on the URIs only including or being associated with the prefix "/campus/buildings/BuildingA", e.g.). In this case, the Composite Gateway may translate the URIs by removing the prefix "/campus/buildings/BuildingA" (e.g., transforming the URIs from the form shown in Table 6 back to the form shown in Table 5), for example, and then forward the message with the translated URIs only on interface 412 to Gateway 252a.

Message includes URIs from system load control 304: The Composite Gateway may determine that the message from Web Application 450 only includes URIs corresponding to load control system 304 (the Composite Gateway may make this determination based on the URIs only including or being associated with the prefix "/campus/buildings/BuildingB", e.g.). In this case, the Composite Gateway may translate the URIs by removing the prefix "/campus/buildings/BuildingB" (e.g., transforming the URI's from the form shown in Table 7 back to the form shown in Table 5), for example, and then forwarding the message with the translated URIs only on interface 422 to Gateway 252*b*.

Message includes URIs from load control system 302 and load control system 304: The Composite Gateway may determine that the message from Web Application 450 includes URIs corresponding to load control system 302 and load control system 304 (the Composite Gateway may make this determination based on one or more of the URIs including or being associated with the prefix "/campus/buildings/BuildingA", e.g., and one or more other URIs including or being associated with the prefix "/campus/buildings/BuildingB", e.g.). For load control system 302, the Composite Gateway may remove from the message the URIs corresponding to load control system 304 and may translate the URIs corresponding to load control system 302 by removing the prefix "/campus/buildings/BuildingA" for example. Thereafter, the Composite Gateway may forward the message with the translated URIs of load control system 302 on interface 412 to Gateway 252*a*. Similarly, for load control system 304, the Composite Gateway may remove from the message the URIs corresponding to load control system 302 and may translate the URIs corresponding to load control system 304 by removing the prefix "/campus/buildings/BuildingB", for example. Thereafter, the Composite Gateway may forward the message with the translated URIs of load control system 304 on interface 422 to Gateway 252*b*.

Accordingly, using the prefix URIs for example, the Composite Gateway 452 may provide a composite view of load control system 302 and load control system 304 to the Web Application 450 and the user at network device 164 and at the same time, may route messages to load control systems 302 and 304 such that the load control systems only receive messages on resources they respectively control.

While load control system 400 is shown with Composite Gateway 452 aggregating two load control systems, one will recognize that load control system 400 may be used with one system (such as load control system 302) and then later expanded to include additional load control systems, such as load control system 304. Here, Composite Gateway 452 may first be configured to have one connection (e.g., 412) with an associated URI and then at later time be reconfigured to include additional load control system(s) with additional communication interfaces/connections, with each connection having an associated URI.

Figure 5:
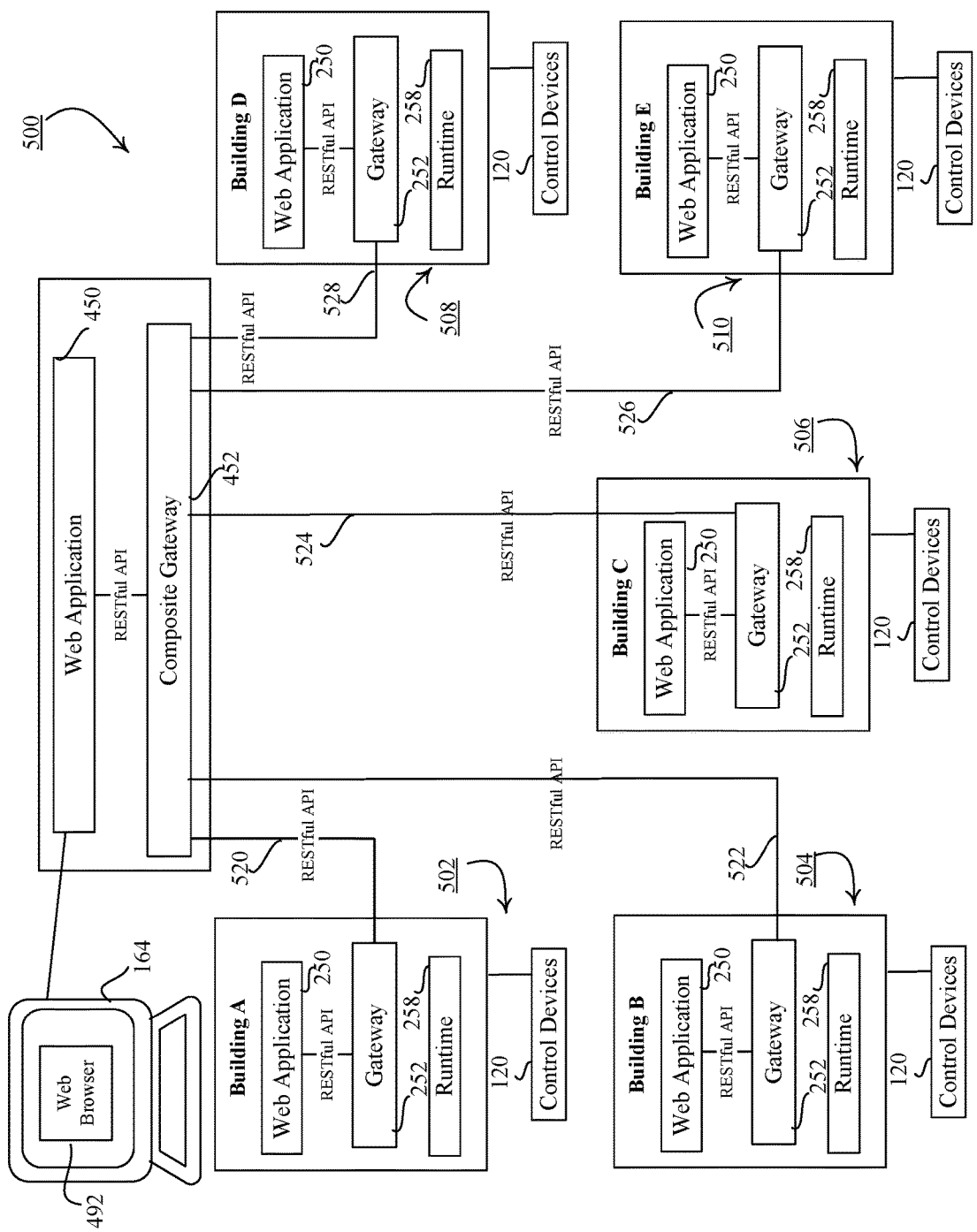
FIG. 5 is a system diagram that illustrates another example load control system.

Similarly, while load control system 400 is shown with Composite Gateway 452 aggregating two load control systems, one will recognize that load control system 400 may be expanded to Composite Gateway 452 aggregating numerous systems. For example, FIG. 5 shows an example load control system 500 that aggregates load control systems 502, 504, 506, 508, and 510 (load control systems 502-510 are only partially shown in FIG. 5). Each of load control systems 502-510 may resemble load control system 100 as described with respect to FIGS. 1 and 2, with respective servers of each load control system resembling servers 210*a* and 210*b*, for example, as described with respect to FIG. 4. Each of load control systems 502-510 may each control a respective building A, B, C, D, and E at diverse geographic locations, for example. For example, load control system 502 may be a load control system for a building A and load control system 504 may be a load control system for a building B. Building A and building B may each be buildings at a first campus #1 on the east coast of the United States. Load control system 506 may be a load control system for a building C at a second campus #2 in the mid-west of the United States. And, Load control system 508 may be a load control system for a building D and Load control system 510 may be a load control system for a building E where building D and building E may each be buildings at a third campus #3 on the west coast of the United States. Each load control system 502-510 may have a respective set of control devices/resources it controls, each with a respective URI as described herein. As similarly described for load control system 400, Composite Gateway 452 may have a respective communications interface/connection 520, 522, 524, 526, and 528 with each of the Gateways 252 of the respective load control systems 502-510. The Composite Gateway 452 may be configured to associate a respective unique URI with each connection such as shown in Table 8.

TABLE 8

Interface 520:/campus/Campus#1/buildings/BuildingA
Interface 522:/campus/Campus#1/buildings/BuildingB
Interface 524:/campus/Campus#2/buildings/BuildingC
Interface 526:/campus/Campus#3/buildings/BuildingD
Interface 528:/campus/Campus#3/buildings/BuildingE One will recognize that while a uniform naming scheme such as "/campus/Campus#1/buildings" is used in this example, this is not necessary and different naming schemes for each URI may be used. As similarly described for load control system 400, the Composite Gateway 452 of load control system 500 may translate URIs as they are passed over each interface 520-526 and to the Web Application 450 by adding and removing the prefixes, for example, of Table 8, and also use these prefixes in routing messages to the respective load control systems 502-510.

Turning again to FIG. 4, according to a further aspect of load control system 400 server 490 may also include a Logging Database 494. This database may be flat database, relational/SQL databases, NoSQL/non SQL database, and/or a time series databases, etc., although any form of database(s) may be used. According to one example, Composite Gateway 452 may be configured to store information of the load control systems 302 and 304, such as status information of control devices (e.g., energy/power consumption status information, occupancy information, etc.), in Logging Database 494. In one example, Composite Gateway 452 may receive a message from Web Application 450 for energy consumption information, for example. Based on this message, Web Application 450 may communicate one or more messages to Gateway 252*a* and/or Gateway 252*b* for such information. In response, Gateway 252*a* and/or Gateway 252*b* may communicate one or more messages containing energy consumption information to the Composite Gateway 452, which may then process the information (such as aggregate the information) and forward the information to Web Application 450, which may then forward the information to network device 164. In addition to forwarding the information to the Web Application, the Composite Gateway 452 may also store the information in Logging Database 494, possibly further processing the information before storing the information. According to a further example, Composite Gateway 452 may subscribe with Gateway 252*a* and/or Gateway 252*b*, for example, to obtain certain information, such as status information of control devices, as the information is generated within the respective load control system 302 and/or load control system 304. As the information is generated, a respective Gateway 252a or 252b may detect the information and automatically forward it to the Composite Gateway, which may then store the information in Logging Database 494 and/or forward the information to Web Application 450. For example, as discussed herein, Q-Processors 270a and 270b may report energy/power consumption status information of respective loads to server 210a and server 210b respectively. Composite Gateway 452 may subscribe with Gateway 252a and Gateway 252b for energy consumption status information. As this information is received into a respective server 210a or 210b, the Gateway 252a and/or Gateway 252b may forward the information to Composite Gateway 452, which may be configured to store the information to Logging Database 494, possibly aggregating the information with other information (e.g., to produce total energy consumption for a given area). One advantage of Logging Database 494 is that if Web Application communicates a message to Composite Gateway 452 for energy consumption information, for example, (e.g., as a result of a user at network device 164 requesting the information), Composite Gateway 452 may access the information from Logging Database 494, rather than having to request the information from the load control systems 302 and 304, and forward the information to Web Application 450. In this fashion, more timely responses may be provided to the user of network device 492. One will recognize that other types of information (other than energy consumption and occupancy/vacancy information) may be stored by the Composite Gateway 452 in Logging Database 494.

Figure 6:
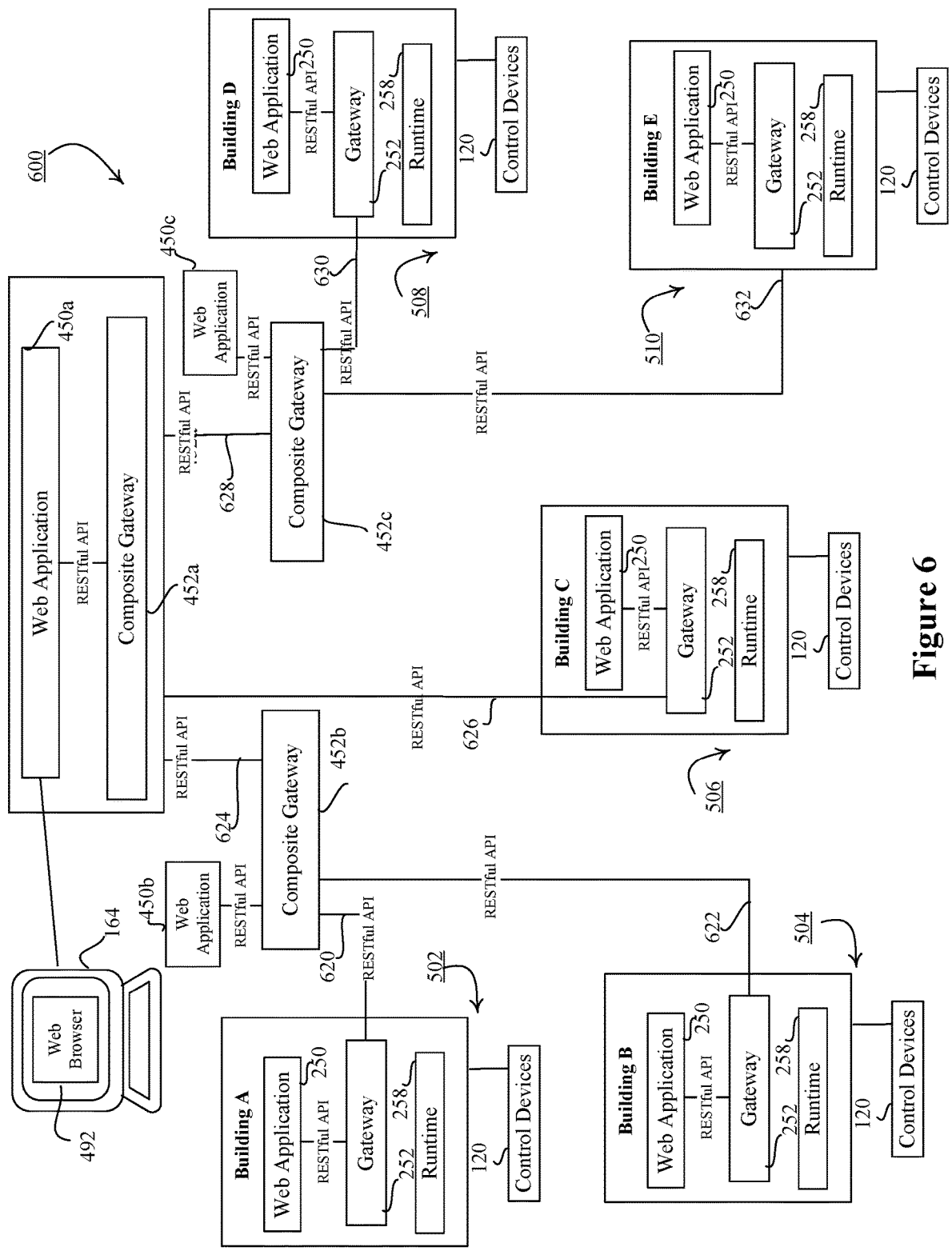
FIG. 6 is a system diagram that illustrates a further example load control system.

Turning now to FIG. 6, there is shown another example load control system 600. Example load control system 600 is similar to load control system 500 of FIG. 5 in that it includes a set of load control systems 502-510 (each of which may resemble load control system 100) controlling respective buildings A-E at diverse geographic locations, for example. Example load control system 600 now includes a hierarchy of Composite Gateways 452a, 452b, and 452c, each of which may operate as similarly described for Composite Gateway 452 as discussed in FIG. 4, for example. FIG. 6 is merely an example and other hierarchal architectures may be used.

Composite Gateway 452b may have communications interfaces/connections 620 and 622 with load control systems 502 and 504. These interfaces and associated APIs may be similar to interface 412 and API 410, for example, of load control system 400. Composite Gateway 452b may also have a communications interface/connection 624 to Composite Gateway 452a and an interface to a Web Application 450b (which may be similar to Web Application 450 of FIG. 4) that may allow a user to control load control systems 502 and 504, although Web Application 450b is not required. These interfaces and associated APIs with the Composite Gateway 452a and the Web Application 450b may be similar to interface 418 and API 430, for example, of load control system 400. As similarly described for load control system 400, Composite Gateway 452b may be configured to associate a URI with communications interface 620 and another different URI with communications interface 622. As similarly described for load control system 400, the Composite Gateway 452b may translate URIs of resources associated with load control systems 502 and 504 as the URIs are passed between load control system 502, load control system 504, the Web Application 450b, and/or the Composite Gateway 452a by adding and removing, for example, the respective URIs associated with interfaces 620 and 622. The Composite Gateway 452b may also use the URIs associated with load control systems 502 and 504 in routing messages it receives from Web Application 450b and/or Composite Gateway 452a to load control systems 502 and 504, as similarly described for system 400. The Composite Gateway 452b may also aggregate information from load control systems 502 and 504 as similarly described for load control system 400 and perform operations on such information before forwarding information to Composite Gateway 452a and/or Web Application 450b.

Similarly, Composite Gateway 452c may have communications interfaces/connections 630 and 632 to load control systems 508 and 510. These interfaces and associated APIs may be similar to interface 412 and API 410, for example, of load control system 400. Composite Gateway 452c may also have a communications interface/connection 628 to Composite Gateway 452a and an interface to a Web Application 450c (which may be similar to Web Application 450 of FIG. 4) that may allow a user to control load control systems 508 and 510, although Web Application 450c is not required. These interfaces and associated APIs with the Composite Gateway 452a and the Web Application 450c may be similar to interface 418 and API 430, for example, of load control system 400. Similar to Composite Gateway 452b, Composite Gateway 452c may be configured to associate a URI with communications interface 630 and another different URI with communications interface 632. Composite Gateway 452c may translate URIs of resources associated with load control systems 508 and 510 as they are passed between load control system 508, load control system 510, the Web Application 450c, and/or the Composite Gateway 452a by adding and removing, for example, the respective URI's associated with interfaces 630 and 632. The Composite Gateway 452c may also use the URIs associated with load control systems 508 and 510 in routing messages it receives from Web Application 450c and/or Composite Gateway 452a to load control systems 508 and 510 as similarly described for load control system 400. The Composite Gateway 452c may also aggregate information from load control systems 508 and 510 as similarly described for load control system 400 and perform operations on such information before forwarding information to Composite Gateway 452a and/or Web Application 450c.

Composite Gateway 452a may have communications interfaces/connections 624, 626, and 628 to Composite Gateway 452b, to load control system 506, and to Composite Gateway 452c. Composite Gateway 452a may also have a communications interface 634 to a Web Application 450a that may allow a user to control load control systems 502, 504, 506, 508 and 510. Communications interface 634 and its associated API may be similar to interface 418 and API 430, for example, of load control system 400. Composite Gateway 452a may be configured to associate a URI with communications interface 624, another different URI with communications interface 626, and a further different URI with communications interface 628. Similar to Composite Gateway 452, Composite Gateway 452a may translate URIs of resources as the URIs are passed over each interface 624, 626, and 628 between Composite Gateway 452b, the Gateway 252 of load control system 506, Composite Gateway 452c, and the Web Application 450a by adding and removing, for example, the respective URIs associated with the interfaces. The Composite Gateway 452a may also use the URIs associated with interfaces 624, 626, and 628 in routing messages as similarly described for load control system 400. The Composite Gateway 452a may also aggregate information from Composite Gateway 452b, load control system 506, and/or Composite Gateway 452c as similarly described for load system 400 and perform operations on such information before forwarding information to Web Application 450a.

As an example of how load control system 600 may operate, a URI passed by the Gateway 252 of load control system 502 to Composite Gateway 452b may be modified by Composite Gateway 452b to include the URI Composite Gateway 452b associates with interface 620. Similarly, as Composite Gateway 452b passes this modified URI over interface 624 to Composite Gateway 452a, Composite Gateway 452a may further modify the URI to include the URI Composite Gateway 452a associates with interface 624, and then forward this further modified URI to Web Application 450a. The opposite may occur as resource URIs are passed from Web Application 450a to load control system 502, with each of Composite Gateways 452a and 452b using the URIs as a routing mechanism, and removing the added URI as it passes the resource URI down towards the respective load control system. In general, through a network device 164, a user may access Web Application 450a and control load control systems 502-510 in an aggregated/composite fashion through one web browser. Similarly, through a network device 164, a user may access Web Application 450b and control load control systems 502 and 504 in an aggregated/composite fashion through one web browser. As similarly described for load control system 400, according to a further aspect of load control 600 is that any of Composite Gateway 452a, Composite Gateway 452b, and Composite Gateway 452c may have a Logging Database associated with it, similar to Logging Database 494. The respective Composite Gateway may use its respective database to store information for load control system(s) it communicates with. Again, such databases may provide quicker access to information.

Figure 7A:
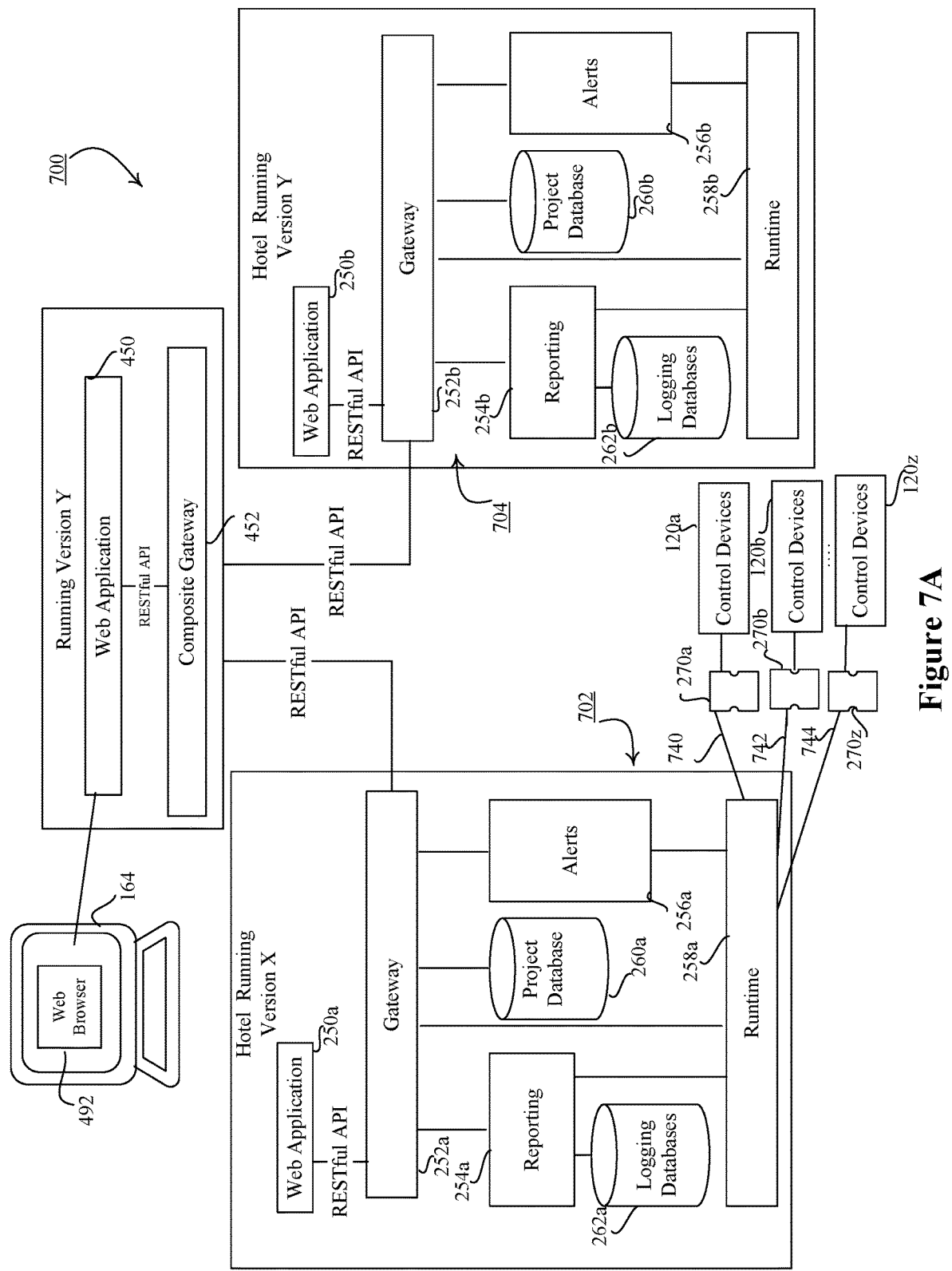
FIG. 7A is a system diagram that illustrates an example application of the load control system of FIG. 4.

Referring now to FIG. 7A, there is shown another example load control system 700 showing another example application of load control system 400 of FIG. 4. According to this example, a hotel may have a load control system 702 running Version X of application software (load control system 702 may be similar to load control system 100). As an example, load control system 702 may be configured such that each hotel room is assigned a respective Q-processor 270a-z, with each Q-processor controlling the load control devices 120a-z for its respective room. Each Q-processor may have a respective communications connection 740-744 to Runtime 258a of load control system 702. An administrator may desire to upgrade the load control system 702 to run a Version Y of application software, for example.

According to this example, it may not be possible to migrate the entire load control system to version Y because of room occupancy. Accordingly, an administrator may install another load control system 704 running version Y of the application software (load control system 704 may be similar to load control system 100) and integrate the load control systems as discussed herein through Composite Gateway 452 and Web Application 450. Again, load control system 702, load control system 704, Composite Gateway 452, and Web Application 450 may execute on the same server, each on different servers, or some combination thereof, including as cloud-based systems.

An administer may group one or more Gateways into a Gateway Group. During an upgrade or migration, for example, an administrator may group Gateways (e.g., Gateways 252a and 252b) that currently manage or have previously managed the same resource in a Gateway Group. Also, or alternatively, an administrator may group Gateways that are in the same physical location (e.g., a building or hotel) in a Gateway Group. A Composite Gateway may then use a Gateway Group to facilitate requests made by a user via a single access point (e.g., Web Browser 492). Examples may be provided herein of a system upgrade within the context of a hotel, but these examples may be used to facilitate a request in any load control system running multiple versions of software.

Figure 7B:
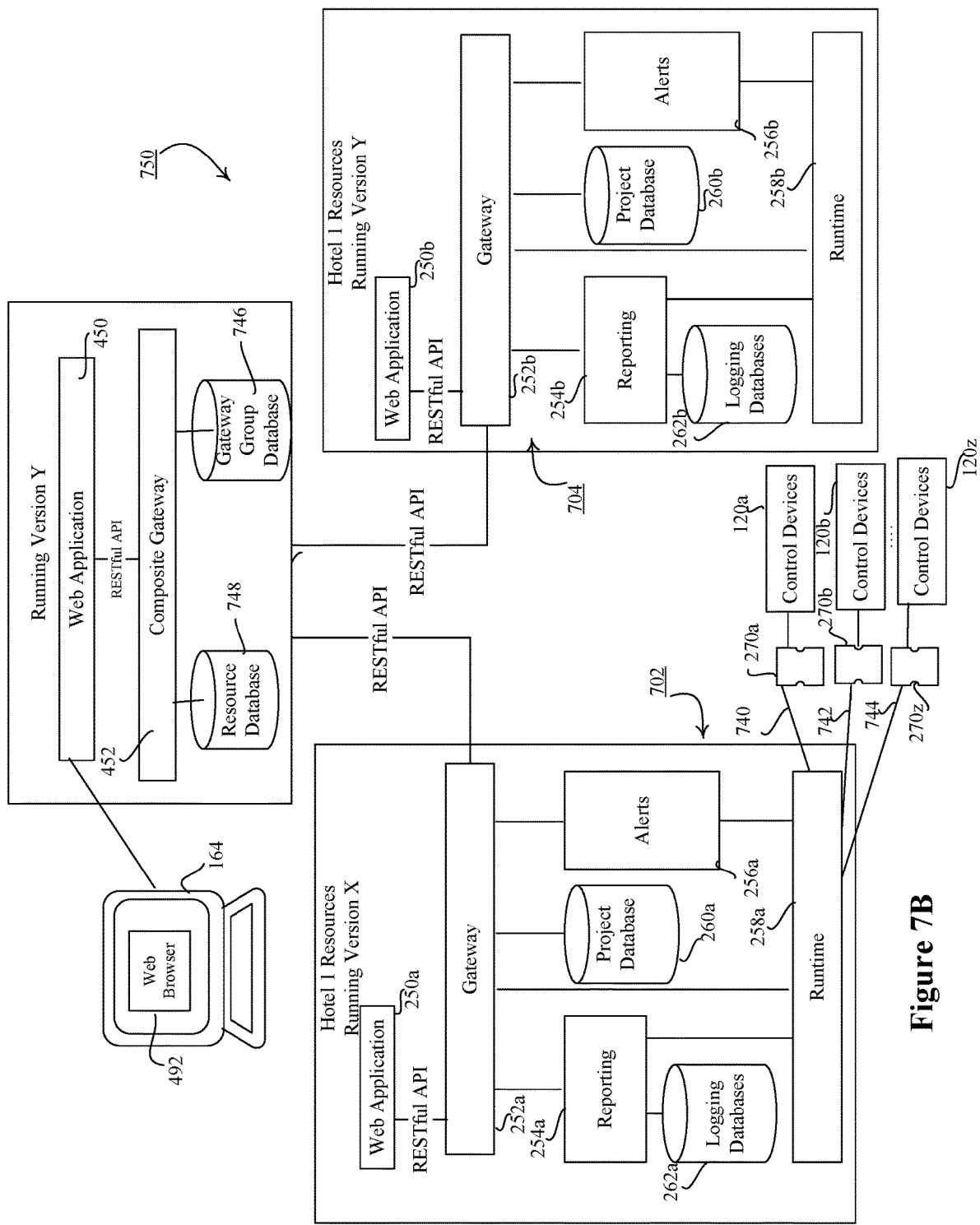
FIG. 7B is system diagram that illustrates an example application of the load control system of FIG. 7A.

FIG. 7B is an example of load control system 750, showing how a Composite Gateway 452 may function when a hotel is running multiple versions of application software on multiple load control systems 702 and 704 (e.g., an upgrade scenario) and/or multiple load control system devices 120a-z. Load control system 750 may be similar to load control system 700. As described herein, an upgrade scenario may exist when an administrator of a load control system upgrades the load control system software. For example, the upgraded software may include computational efficiencies and/or provide additional features.

The Composite Gateway 452 may maintain a Gateway Group Database 746, which may include information to facilitate communication as one or more load control systems are being upgraded/migrated. The Gateway Group Database 746 may detail the Gateways of the load control systems in communication with the Composite Gateway 452 (e.g., Gateway 252a and Gateway 252b), and any Gateway Group of which the Gateway is a member. Again, the Gateway Group may be configured by an administrator during, for example, an upgrade. This database may be a flat database, relational/SQL databases, NoSQL/non-SQL database, a time series databases, etc., although any form of database(s) may be used. In general, one or may Gateways of respective load control systems may be assigned to the same "group" when the respective load control systems are controlling or have controlled the same resources, such as in an upgrade/migration scenario.

After load control system 704 is installed, the Gateway Group Database may indicate that Gateway 252a and Gateway 252b are members of the same Gateway Group. As described herein, Gateway 252a and Gateway 252b may be members of the same Gateway Group because Gateway 252b is an upgrade of Gateway 252a. A name may be given to each Gateway and/or each Gateway Group. The names given to a Gateway and/or a Gateway Group may also be stored in the Gateway Group Database 746. The Gateway name may identify the version of software residing on a given Gateway. For example, the name Version X may be stored for Gateway 252a, and the name Version Y may be stored for Gateway 252b. The Gateway Group may identify the Gateways that are in a given location and/or that have been upgraded to a given version of software. For example, the name Hotel 1 may be stored for the Gateway Group that includes Gateway 252a and Gateway 252b. Internally, in an effort to simplify naming conventions, the Composite Gateway may be configured to refer to Gateway and/or Gateway Groups using a shorthand (e.g., Gateway may be referred to as GW and Gateway Group may be referred to as GG). As described herein, the strings "GG" and "GW" may indicate whether a resource is associated with a Gateway Group. However, these strings may be configured by an administrator and, accordingly, may be any string. As described herein, these strings may be used to facilitate routing (e.g., used as prefixes, such as "/GW").

As a room becomes vacant, for example, such as the room associated with Q-processor 270a, an administrator may disassociate the room with load control system 702 and associate the room with load control system 704. This disassociation and association procedure may include: updating Project Database 260a to indicate the control devices 120a are disabled, removing connection 740 between Q-processor 270a and Runtime 258a, upgrading Q-processor 270a to version Y, copying relevant information pertaining to control devices 120a from Project Database 260a to Project Database 260b, and forming a communications connection between Q-processor 270a and Runtime 258b of load control system 704. Other rooms may be moved in similar fashion. Thereafter, a user at network device 164 may interact with Web Application 450 and still have a single access point to all rooms. Also or alternatively, Project Database 260a may be directly copied to Project Database 260b and rooms may be marked as enabled or disabled in the respective Project Database. After an upgrade is complete, Logging Databases 262a and Logging Databases 262b may be combined into a single and complete Logging Database. Also or alternatively, after the upgrade is complete, load control system 702 may be turned off.

During an upgrade, some resource information may not be copied to the updated system. For example, usage information tracking energy or device usage (e.g., information stored in Logging Databased 262a) prior to the upgrade may not be copied to the updated system (e.g., in order to increase efficiency). Accordingly, information about an upgraded resource may exist in both a legacy system (e.g., load control system 702) and an upgraded system (e.g., load control system 704). In other words, after an upgrade, the updated system may control a resource (e.g., as indicated by the Project Databases 260n and/or the Resource Database 748), but both the legacy load control system (e.g., load control system 702) and the upgraded load control system (e.g., load control system 704) may have information about the resource (e.g., information stores in Logging Databases 262a and Logging Databased 262b).

The time at which the room is marked as disabled in the legacy system (e.g., load control system 702) may be stored (e.g., stored in Project Database 260a and/or stored in Resource Database 748). Similarly, the time at which the room is enabled in the upgraded system (e.g., load control system 704) may be stored (e.g., stored in Project Database 260b). This timestamping information may be used to facilitate requests about the upgraded resources. For example, the disabled timestamp may indicate that information about the resource prior to the upgrade may be found in the legacy system (e.g., load control system 702). Similarly, the enabled timestamp may indicate that information about the resource after the upgrade may be found in the upgraded system (e.g., load control system). Again, this example is described using two systems (e.g., a legacy system and an upgraded system), but similar techniques may be used to facilitate requests for any number of systems.

According to this example, as Gateway 252a receives commands from Composite Gateway 452 to provide indications of the resources/control devices controlled by load control system 702, Gateway 252a may not provide URIs of control devices 120a, these devices being disabled in Project Database 260a and now part of load control system 704 and reported by Gateway 252b. However, as described herein, Gateway 252a may continue to provide information on these resources as stored in Logging Database 262a (e.g., usage information). Referring again to FIG. 7B, the Composite Gateway may maintain a Resource Database 748. The Resource Database 748 may detail the resources in communication with the Composite Gateway, and which Gateway/load control system is actively responsible for the resource. This database may be a flat database, relational/SQL databases, NoSQL/non-SQL database, a time series databases, etc., although any form of database(s) may be used. The Composite Gateway may use the information in the Resource Database 748 in conjunction with the Gateway Group Database 746 to appropriately respond to user requests. For example, the Composite Gateway may use the Resource Database 748 to determine which Gateway actively manages the resource. The Composite Gateway may determine if the Gateway is a member of a Gateway Group using the Gateway Group Database 746.

As described herein, the Composite Gateway may function as router, translator, and/or aggregator of information, which may be achieved by attaching a prefix to resource URIs. As the Composite Gateway receives URIs of resources from a Gateway, the Composite Gateway may determine if the resource is a member of a Gateway Group (e.g., by referencing the Gateway Group Database 746), and attach a prefix indicating the resource is controlled by a Gateway that is a member of a Gateway Group before passing the resource to the Web Application. For example, referring to FIG. 7B, if the Composite Gateway receives a URI from Gateway 252a or 252b, it may attach "/gg:Hotel 1" to the resource URI as a prefix. As described herein, gg may refer to Gateway Group, and Hotel 1 may be the name of the Gateway Group. Again, this naming convention may be configured by an administrator. Similarly, as the Composite Gateway receives URIs from the Web Application 450, the Composite Gateway may determine if the URI is associated with a Gateway Group. For example, referring to FIG. 7B, the Composite Gateway may search for the string prefix "/gg:Hotel 1" in the URI to determine that the URI is associated with the Hotel 1 Gateway Group. The string "gw" may indicate that the resource is not associated with a Gateway Group (e.g., the Gateway does not currently or previously manages a resource that is or has been managed by another Gateway), and a similar prefix attachment procedure may be performed for resources that are not associated with a Gateway Group. The Composite Gateway may use the Gateway Group prefix attachment to respond to requests. For example, if the Composite Gateway receives a resource control request, the Composite Gateway may route the request to the load control system that actively manages the resource. If, for example, the Composite Gateway receives an information request, the Composite Gateway may route the request to multiple load control systems (e.g., as the information may be stored in multiple load control systems).

The Gateway Group prefix attachment procedure described above may differ slightly from the other prefix attachment described herein. For example, in other prefix attachment procedures described herein, the Composite Gateway may perform prefix attachment based on the interface (e.g., Gateway) on which a message is received. However, in a Gateway Group scenario, the Composite Gateway may perform prefix attachment by additionally determining whether the Gateway is member of a Gateway Group. Again, this may apply when multiple load control systems run multiple version of software (e.g., an upgrade scenario). After all systems have been upgraded, for example, the Composite Gateway may continue to use the Gateway Group prefix attachment or revert back to other prefix attachment procedures.

A Composite Gateway, after receiving a request from the Web Application/Web browser, may apply a policy to the request. For example, the policy applied may be based on the type of request, a resource URI included in the request, and/or the resource URI being associated with a Gateway Group. Policies may include authorization polices, aggregation policies, routing policies, updating policies, etc., and, as described herein, may generally refer to one or more actions taken by the Composite Gateway to facilitate a request.

A user at network device 164, interacting with Web Application 450 and Composite Gateway 452 may request usage information about a resource that has been upgraded to Version Y of the software (e.g., Control Devices 120*a*). The Composite Gateway 452 may determine that the resource is actively managed by Gateway 252*b* (e.g., by referring to Resource Database 748). Similarly, the Composite Gateway 452 may determine that Gateway 252*b* is a member of the Hotel 1 Gateway Group (e.g., by referring to Gateway Group Database 746). Depending on the type of request, the Composite Gateway may be prompted to communicate with the other Gateways in the Gateway Group (e.g., Gateway 252*a*). The Composite Gateway 452 may then apply one or more polices based on the information it determined about the resource.

Usage and/or Activity information for a resource that has been upgraded may be located in multiple databases on multiple load control systems. For example, usage information prior to an upgrade may be located on an original database (e.g., Logging Databases 262*a*) and usage information after the upgrade may be located on an upgraded database (e.g., Logging Databases 262*b*). Again, as described herein, the Composite Gateway may determine this information by referring to the Gateway Group Database, the Resource Database, the timestamping information, and/or any combination thereof.

After determining that the resource is associated with a Gateway (e.g., Gateway 252*b*) that is a member of a Gateway Group (e.g., the Hotel 1 Gateway Group), the Composite Gateway may apply an authorization policy to determine if the user is authorized to view the information. The authorization policy may be defined, by an administrator, at the Gateway Group level. If the user is authorized, the Composite Gateway may apply a routing policy to route the request to the Gateways in the Gateway Group (e.g., Gateway 252*a* and Gateway 252*b*). After receiving usage information from the respective Gateways in the Gateway Group, the Composite Gateway may apply an aggregation policy, which may aggregate the information received from the relevant Gateways. After the usage information is aggregated, the Composite Gateway may provide the information to the user through the procedures described herein. The Composite Gateway may facilitate the routing of these requests by attaching a prefix to the URI, which may indicate the Gateway Group.

A user at network device 164, interacting with Web Application 450 and Composite Gateway 452 may request control of a resource that has not been upgraded to Version Y of the software (e.g., Control Devices 120*b*). The Composite Gateway 452 may determine that the resource is actively managed by Gateway 252*a* (e.g., by referring to Resource Database 748). Similarly, the Composite Gateway 452 may determine that Gateway 252*a* is a member of the Hotel 1 Gateway Group (e.g., by referring to Gateway Group Database 746), and may attach the appropriate prefix. As described herein, prefix attachment may occur as the Composite Gateway routes messages up to the Web Application, but may not occur when the Composite Gateway routes messages down to a Gateway. Based on the type of request, the Composite Gateway may determine that the request may be facilitated by consulting with the active Gateway (e.g., because the active Gateway may control the resource). The Composite Gateway may then apply one or more polices based on the request. For example, the Composite Gateway may apply an authorization policy to determine if the user is authorized to control and resource. If the user is authorized to control the resource, the Composite Gateway may apply a routing policy to route the request to the appropriate Gateway (e.g., Gateway 252*a*). This procedure may be similar for controlling an upgraded resource, but, again, the policies applied may differ slightly (e.g., the routing policy may route the request to the upgraded Gateway 252*b*). Generally, policies may be applied to any of the techniques described herein.

Gateway Groups, as described herein, may allow a user to seamlessly interact with multiple load control system, which may run multiple versions of software and provide different functionality, using a single interface. The examples provided are not exclusive and merely describe how Gateway Groups may be implemented. One skilled in the art will appreciate that Gateway Groups may be implemented in many scenarios in order to provide seamless integration for systems running multiple versions of software.

Figure 8:
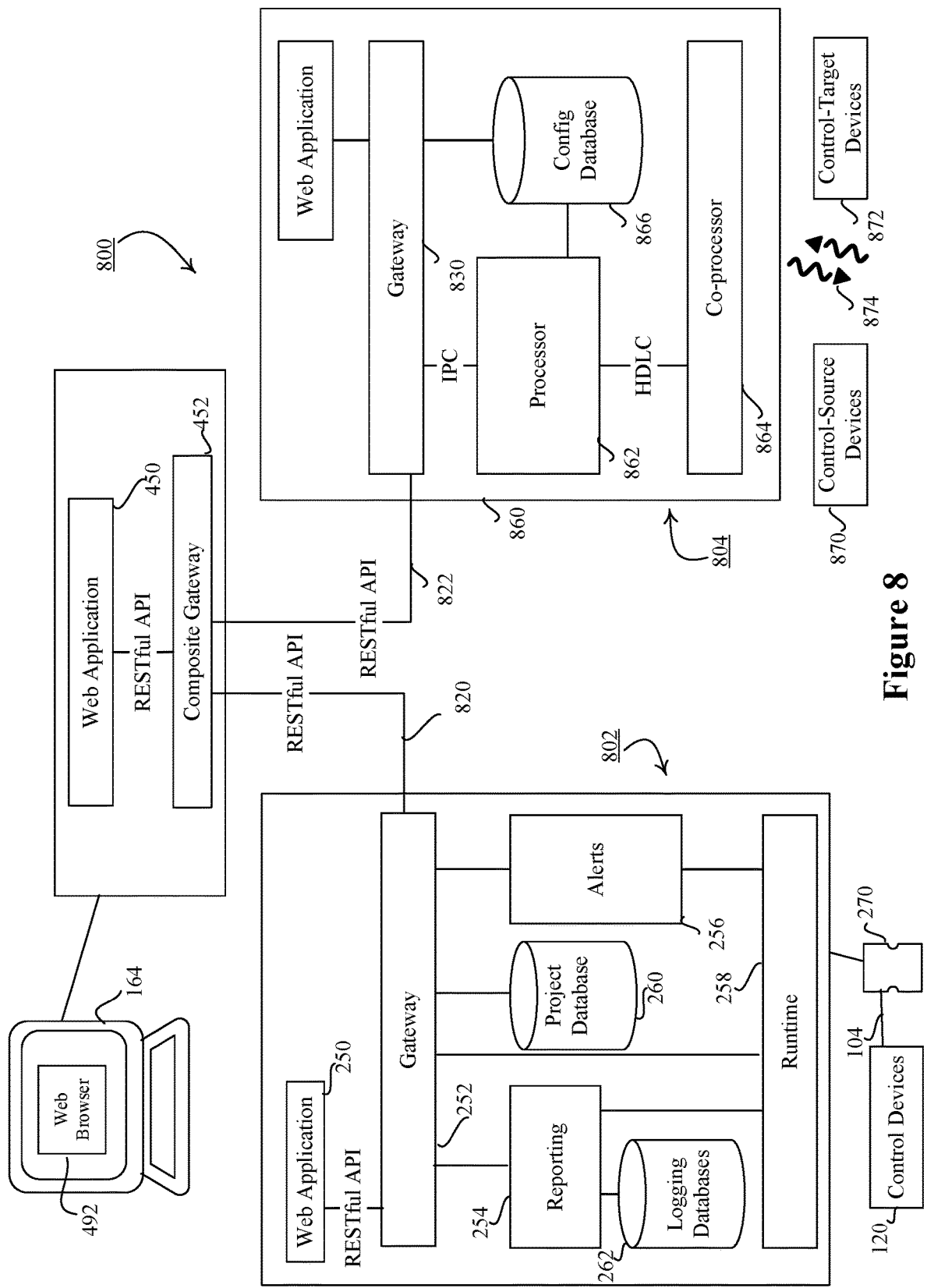
FIG. 8 is a system diagram that illustrates another example load control system.

Referring now to FIG. 8, there is shown another example load control system 800. While the Composite Gateway has been described herein as connecting multiple load control systems that have similar architectures (e.g., a Reporting Module, Alerts Module, Runtime Module, etc.), the Composite Gateway may also be used to integrate load control systems having different architectures. For example, load control system 800 may include a load control system 802 that may be similar to load control system 100 and/or 302, for example. Load control system 800 may also include a load control system 804 that may a different architecture from load control system 802. Like load control system 802, load control system 804 may enable the automated control of lighting systems, shades, and heating, ventilating, and/or air conditioning (HVAC) systems in a user environment, among other electrical loads. The load control system 804 may also allow a user to control and monitor a user environment including, for example, over-riding automated settings, determining occupancy at one or more locations in the environment, determining power/energy usage at one or more locations in the environment, determining error conditions with electrical loads in the user environment, etc. Load control system 804 may include a system controller 860 and a number of control-source devices 870 and a number of control-target devices 872. The control-source devices, the control-target devices, and the system controller may communicate via messages that are transported via wireless signals 874 (such as RF signals). For example, a control-source device 870 may communicate wireless messages directly to a control-target device 872 to control the device, and/or may communicate such messages to the system controller 860, which may then communicate the messages to the control-target device. Similarly, the system controller 860 may communicate wireless messages with the control-source devices 870 and/or control-target devices 872, such as to configure and control the control devices, to obtain status information from the control devices, etc. The system controller 860 may include a processor 862 and co-processor 864 that may each execute one or more software-based applications, for example. Processor 862 may be configured to provide overall control of the system controller 860, such as time-clock applications and monitoring of error and status information of the control devices, while the co-processor 864 may manage communication messages between the system controller and control devices and/or communications between the control devices. The system controller may include a configuration database 866 that may store similar information as the Project Database 260 of load control system 100, for example. This is merely one example and load control system 804 may have other configurations. For example, U.S. Patent Application Publication No. 2017/0123390, entitled Commissioning Load Control Systems describes another example load control system. The contents of U.S. Patent Application Publication No. 2017/0123390 are hereby incorporated by reference herein in their entirety. To integrate load control system 804 into load control system 800 as described herein, system controller 860 may modified to also include a Gateway 830 that may be similar to Gateway 252 of load control system 802, for example, and that may communicate with Composite Gateway 452 through an interface 822 and API similar to the way Gateway 252 may communicates through interface 820 to the Composite Gateway 452. Nonetheless, the way in which Gateway 830 interacts with the components (e.g., processor and configuration database) of system controller 860 may be different than the way Gateway 252 interacts with the modules of load control system 802. System controller 860 may also be configured to represent the control devices etc. of load control system 804 as resources that have respective URIs as similarly discussed herein. In this fashion, Composite Gateway 452 may associate respective URIs with each interface 820 and 822 and communicate/route messages to/from the load control systems 802 and 804 as described herein. A user of network device 164 may now view load control systems 802 an 804 as one load control system. One will further recognize that rather than integrate different types of load control systems, Composite Gateway 452 may also be used to integrate additional and other types of systems in system 800, such as alarm systems, door bell systems, etc. Again, this may be done by modifying such systems to include a Gateway like Gateway 252 and to represent resources that have respective URIs as similarly discussed herein.

Referring again to system 600 of FIG. 6, Composite Gateway 452*a* is shown as having connections 624 and 628 to Composite Gateway 452*b* and Composite Gateway 452*c*, respectively. In addition to these connections, Composite Gateway 452*a* may also have communications connections/interfaces directly to the Gateway of load control system 502, the Gateway of load control system 504, the Gateway of load control system 508, and/or the Gateway of load control system 510 and may also associate a URI with each interface. In this fashion, the Composite Gateway 452*a* may communicate with a respective load control systems 502, 504, 508, and 510, for example, either directly or through Composite Gateway 452*b* or Composite Gateway 452*c*. Whichever interface/connection the Composite Gateway 452*a* uses to communicate with a load control system, responses from the respective load control system may be received back by the Composite Gateway 452*a* over the same connection.

Figure 9:
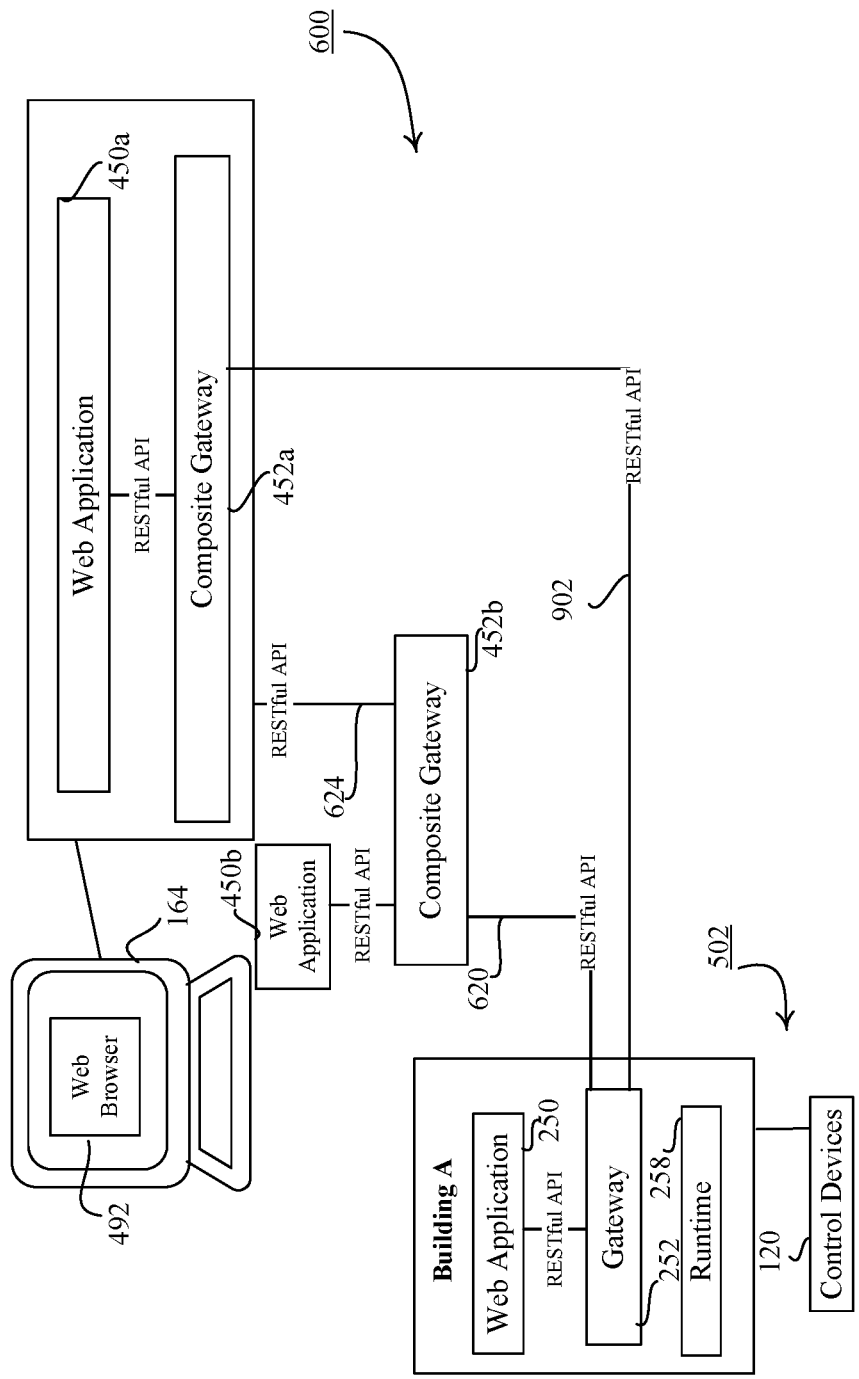
FIG. 9 is a system diagram that illustrates another example load control system.

The URI that the Composite Gateway 452*a* associates with a connection that is directly connected to a load control system may be the same as or similar to the URI that Composite Gateway 452*b* or Composite Gateway 452*c* associates with the load control system. For example, FIG. 9 shows a portion of system 600 of FIG. 6 with Composite Gateway 452*a* now also having a communications connection/interface 902 with the Gateway 252 of load control system 502. Composite Gateway 452*b* may associate the URI "/buildings/BuildingA", for example, with interface 620. Composite Gateway 452*a* may associate the URI "/campus/Campus#1" with interface 624 and may also associate the URI "/BuildingA" (or "/buildings/BuildingA") with interface 902. Continuing with this example, load control system 502 may have a resource with the URI "/drivers/Driver-ID#1", for example. If the Gateway of load control system 502 passes the URI "/drivers/Driver-ID#1" to Composite Gateway 452*b* over connection 620, Composite Gateway 452*b* may amend the URI of the resource to include "/buildings/BuildingA" (e.g., "/buildings/BuildingA/drivers/Driver-ID#1"). Similarly, if the Composite Gateway 452*b* passes the amended URI to Composite Gateway 452*a* over connection 624, Composite Gateway 452*a* may amend the URI to further include "/campus/Campus#1" (e.g., "/campus/Campus#1/buildings/BuildingA/drivers/Driver-ID#1"). This amended URI may be passed to Web Application 450*a*. Similarly, if the Gateway of load control system 502 passes the URI "/drivers/Driver-ID#1" to Composite Gateway 452*a* over connection 902, Composite Gateway 452*a* may amend the URI of the resource to include "/BuildingA" (e.g., "/BuildingA/drivers/Driver-ID#1"), which may be passed to Web Application 450*a*.

The architecture of FIG. 9 may allow communication efficiencies as follows. If Web Application 450*a* communicates a message with the URI "/campus/Campus#1/buildings/BuildingA/drivers/Driver-ID#1", for example, to Composite Gateway 452*a*, the Composite Gateway 452*a* may be configured to communicate the message with load control system 502 in different fashions (which may depend on the message from Web Application 450*a*, e.g.). For example, noting the "/campus/Campus#1" prefix and noting that this prefix is associated with connection 624, Composite Gateway 452*a* may remove the prefix and communicate/route the message with the modified URI "/buildings/BuildingA/drivers/Driver-ID#1" to Composite Gateway 452*b* over connection 624. Composite Gateway 452*b* may subsequently communicate the message with load control system 502 as described herein, removing the "/buildings/BuildingA" prefix before forwarding the message with the further modified URI "/drivers/Driver-ID#1" to the Gateway 252 of load control system 502. Alternatively, noting the "/BuildingA" prefix for example, and noting that this prefix is associated with connection 902, Composite Gateway 452*a* may remove the prefix "/campus/Campus#1/buildings/BuildingA" and communicate/route the message with the modified URI "/drivers/Driver-ID#1" to the Gateway of load control system 502 over connection 902. Again, the Gateway 252 of load control system 502 may respond back over the connection on which it received the respective message. This is one example, and other examples are possible.

Figure 10:
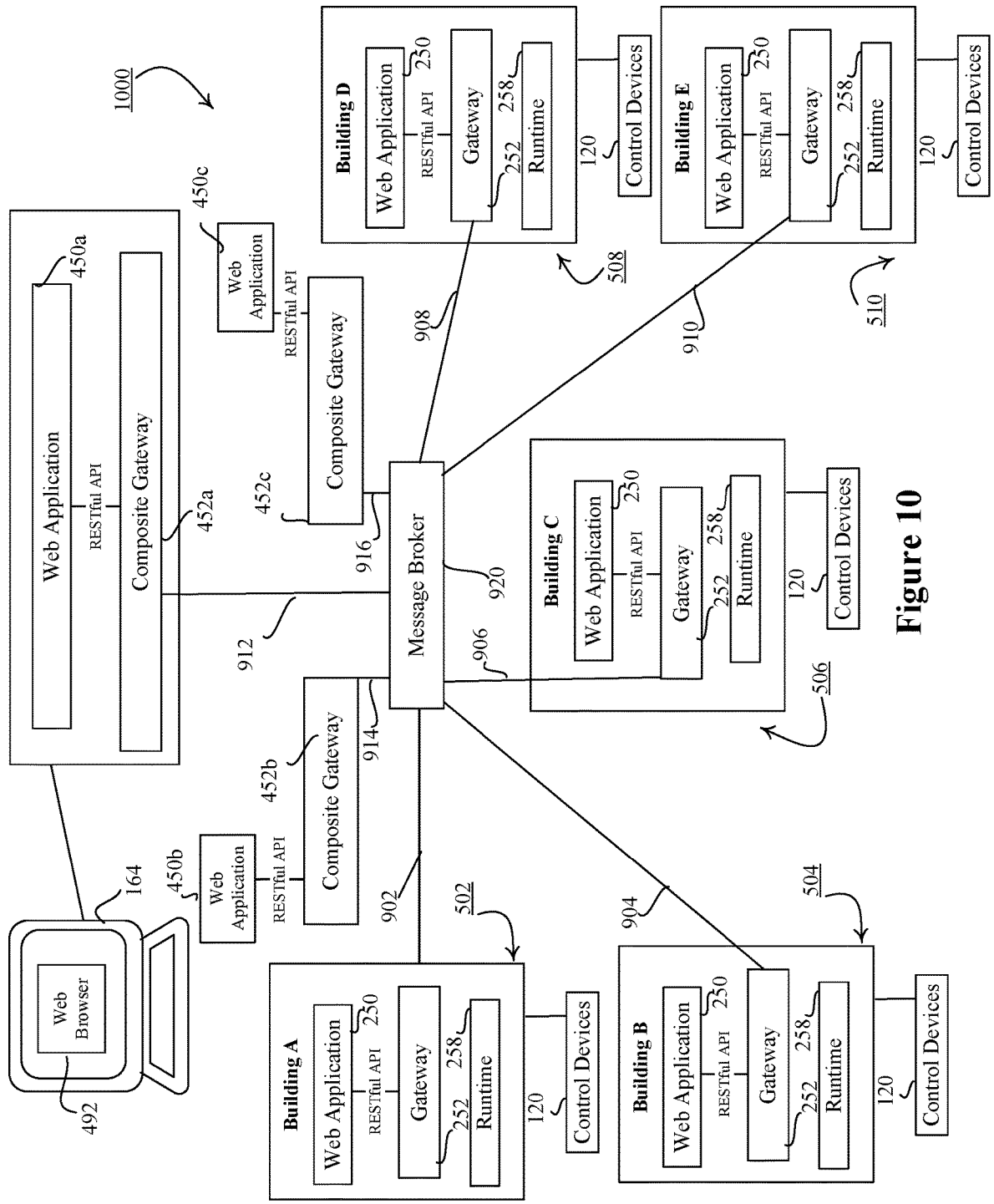
FIG. 10 is a system diagram that illustrates a further example load control system.

As described herein, the connections 412 and 422 of load control system 400 of FIG. 4, for example, and the connections 620, 622, 624, 626, 628, 630, and 632 of load control system 600 of FIG. 6 for example (and similarly connections of system 500) may be, for example, TCP based connections between respective gateways. Referring now to FIG. 10 there is shown an example load control system 1000. Load control system 1000 may be similar to the other load control system described herein (with the example of FIG. 10 being similar to the architecture of load control system 600). However, rather than the Gateways 252 of the load control systems and the Composite Gateways 452*a*-*c* being directly connected through respective TCP connections (e.g., 620, 622, 624, 626, 628, 630, and 632) for example, they may be interconnected through a Message Broker 920. Specifically, the respective Gateways 252 of each of the load control systems 502, 504, 506, 508, and 510 may have respective connections 902, 904, 906, 908, and 910 (such as TCP connections) with the Message Broker 920. Similarly, the respective Composite Gateways 452*a*, 452*b*, and 452*c* may have respective connections 912, 914, and 916 (such as TCP connections) with the Message Broker 920. The Message Broker 920 may support a messaging protocol over these connections such as the Advanced Message Queuing Protocol (AMQP) or the Message Queue Telemetry Transport (MQTT) protocol. Using a message-based architecture/protocol, the Message Broker 920 may route messages between the Gateways and Composite Gateways (e.g., in a publish/subscribe fashion).

On top of this message-based architecture, Composite Gateway 452b may maintain logical connections (not shown) with each of the Gateways 252 of load control systems 502 and 504. These logical connections may be similar to connections 620 and 622 of load control system 600 (i.e., have a respective URI associated with each logical connection and support a RESTful API, etc.). Similarly, Composite Gateway 452c may maintain logical connections (not shown) with each of the Gateways 252 of load control systems 508 and 510. These logical connections may be similar to connections 630 and 632 of load control system 600 (i.e., have a respective URI associated with each logical connection and support a RESTful API, etc.). Similarly, Composite Gateway 452a may maintain logical connections (not shown) with each of the Composite Gateways 452b and 452c, and with the Gateway 252 of load control system 506. These logical connections may be similar to connections 624, 626, and 628 of system 600 (i.e., have a respective URI associated with each logical connection and support a RESTful API, etc.). In addition, Composite Gateway 452a may maintain a logical connection (not shown) with each of the Gateways 252 of load control systems 502, 504, and 508, and 510 and associate a respective URI with each logical connection (with each connection again supporting a RESTful API provided by the Gateways, etc.). In other words, Composite Gateway 452a may maintain multiple connections as similar discussed with respect to FIG. 9. Under this architecture of logical connections and associated URIs, load control system 1000 may operate as similarly described for load control systems 400, 500, 600, 700, and 800, for example, with Message Broker 920 handling the underlying routing of messages between modules/load control systems.

According to another aspect of load control system 1000, in addition to the logical connections between Gateways and Composite Gateways, the system may also include (e.g., at the same time) direct connections (e.g., connections similar to 620, 622, 624, 626, 628, 630, and/or 632) between Gateways and Composite Gateways as similarly described for systems 400, 500, 600, 700, and 800.

Reference is now made to one example process by which multiple load control systems may be viewed/managed as one load control system, for example. While this example is described as a sequence of operations, not all operations may be necessary, additional and/or other operations may be included, and the order of the operations may vary. According to this example, a Composite Gateway may receive a first message from a Web Application. Based on the first message, the Composite Gateway may communicate a second message on a first communications connection to a first load control system. The Composite Gateway may associate a uniform resource identifier (URI) with the first communications connection. The first load control system may be configured to control electrical loads for a load control environment. The first load control system may include a first control device. The load control system may be configured to associate a URI with the first control device. Responsive in part to communicating the second message to the load control system, the Composite Gateway may receive a third message on the first communications connection from the load control system. This the third message received from the first load control system may include the URI associated with the first control device. The Composite Gateway may modify the URI of the first control device to include the URI associated with the first communications connection. Based at least in part on the third message received from the load control system, Composite Gateway may communicate a fourth message to the Web Application. This fourth message may include the modified URI of the first control device. The Composite Gateway may receive from the Web Application a fifth message that includes the modified URI of the first control device. Responsive to receiving the fifth message from the Web Application, the Composite Gateway may remove the URI associated with the first communications connection from the modified URI of the first control device, and based on the fifth message, communicate a sixth message on the first communications connection to the first load control system. The communicated sixth message may include the URI of the first control device without the URI associated with the first communications connection.

According to another and/or additional example, responsive to receiving the fifth message from the Web Application, the Composite Gateway may determine that the fifth message includes a URI that includes the URI associated with the first communications connection. In communicating the sixth message on the first communications connection, the Composite Gateway may communicate the message based at least in part on determining that the fifth message includes a URI that includes the URI associated with the first communications connection.

According to another and/or additional example, based on the first message, the Composite Gateway may also communicate a seventh message on a second communications connection to a second load control system. The Composite Gateway may associate a URI with the second communications connection. This URI may be different from the URI associated with the first communications connection. The second load control system may be configured to control electrical loads for a load control environment. The second load control system may include a second control device. The second load control system may be configured to associate a URI with the second control device. Responsive in part to communicating the seventh message to the second load control system, the Composite Gateway may receive an eighth message on the second communications connection from the second load control system. The eighth message received from the second load control system may include the URI associated with the second control device. The Composite Gateway may modify the URI of the second control device to include the URI associated with the second communications connection.

According to another and/or additional example, the second message communicated on the first communications connection to the first load control system and the seventh message communicated on the second communications connection to the second load control system may each be query messages to determine, respectively, URIs associated with one or more control devices of the first load control system and URIs associated with one or more control devices of the second load control system.

According to another and/or additional example, the second message communicated on the first communications connection to the first load control system and the seventh message communicated on the second communications connection to the second load control system may be communicated to both of the first and second load control systems based at least in part on the first message not including a URI that comprises the URI associated with the first communications connection and not including a URI that comprises the URI associated with the second communications connection.

According to another and/or additional example, when communicating the fourth message to the Web Application the Composite Gateway may form the fourth message based on information from the third message received from the first load control system and information from the eighth message received from the second load control system. The fourth message communicated to the Web Application by the Composite Gateway may include the modified URI of the first control device and the modified URI of the second control device.

According to another and/or additional example, responsive to receiving the fifth message from the Web Application, the Composite Gateway may determine that the fifth message includes a URI that includes the URI associated with the first communications connection. In communicating the sixth message on the first communications connection, the Composite Gateway may communicate the message based at least in part on determining that the fifth message includes a URI that includes the URI associated with the first communications connection. However, the fifth message received from the Web Application may or may not include the modified URI of the second control device. For example, the fifth message received from the Web Application may not include the modified URI of the second control device. Here, responsive to receiving the fifth message from the Web Application, the Composite Gateway may determine that the fifth message does not include a URI that includes the URI associated with the second communications connection, and base at least in part on making this determination, the Composite Gateway may not communicate a message on the second communications connection to the second load control system that is responsive to the fifth message. Alternatively, the fifth message received from the Web Application may include the modified URI of the first control device and may further include the modified URI of the second control device. Here, responsive to receiving the fifth message from the Web Application, the Composite Gateway may determine that the fifth message from the Web Application also includes a URI that includes the URI associated with the second communications connection. Here, the Composite Gateway may remove the URI associated with the second communications connection from the modified URI of the second control device, and based on the fifth message, communicate a ninth message on the second communications connection to the second load control system. The communicated ninth message to the second load control system may include the URI of the second control device without the URI associated with the second communication connection. According to a further aspect of this example, the sixth message communicated on the first communications connection to the first load control system may not include the URI of the second load-control device. Similarly, the ninth message communicated on the second communications connection to the second load control system may not include the URI of the first load-control device.

According to another and/or additional example, based on the first message, the Composite Gateway may communicate a tenth message on a third communications connection to a second Composite Gateway that has a fourth communications connection to a third load control system. The Composite Gateway may associate a URI with the third communications connection. This URI of the third communications connection may be different from the URIs associated with the first and/or second communications connections. The second Composite Gateway may associate a URI with the fourth communications connection. This URI of the fourth communications connection may or may not be different from the URIs associated with the first, second, and/or third communications connections. The third load control system may be configured to control electrical loads for a load control environment. The third load control system may include a third control device. The third load control system may be configured to associate a URI with the third control device. According to this example, the second Composite Gateway may communicate a message on the fourth communications connection to the third load control system in response to receiving the tenth message. Responsive in part to communicating the tenth message to the second Composite Gateway, the Composite Gateway may receive an eleventh message on the third communications connection from the second Composite Gateway. The eleventh message received from the second Composite Gateway may include the URI of the third control device modified by the second Composite Gateway to include the URI associated with the fourth communications connection. The Composite Gateway may further modify the URI of the third control device to include the URI associated with the third communications connection.

According to another and/or additional example, when communicating the fourth message to the Web Application the Composite Gateway may form the fourth message based on information from the third message received from the first load control system, information from the eleventh message received from the second Composite Gateway, and/or information from the eighth message received from the second load control system. The fourth message communicated to the Web Application by the Composite Gateway may include the modified URI of the first control device, the URI of the third control device as modified to include the URI associated with the third communications connection, and/or the modified URI of the second control device.

One will recognize that this is one example and other examples are possible. One will also recognize that the use of first, second, third, etc. herein is meant to distinguish between different messages, control devices, load control systems, communications connections, Composite Gateways etc., for example, and not meant to imply a minimum or maximum number of such messages, control devices, load control systems, communications connections, Composite Gateways, etc.

While systems have been described herein as being applicable to various example scenarios (e.g., buildings, hotels, different versions of software, etc.), one will recognize that these are merely examples and the systems described herein are applicable to other scenarios.

In addition to what has been described herein, the methods and systems may also be implemented in a computer program(s), software, or firmware incorporated in one or more computer-readable media for execution by a computer(s) or processor(s), for example. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random access memory (RAM), removable disks, and optical media such as CD-ROM disks, and digital versatile disks (DVDs).

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. An electrical load control system comprising:
a plurality of system controllers, each communicatively coupled to one or more electrical load control devices, each system controller including a data store containing a respective unique local address for each of the one or more communicatively coupled electrical load control devices;
wherein the electrical load control devices comprise one or more of an electrical load control-source device or an electrical load control-target device;
a plurality of gateway servers, each of the plurality of gateway servers communicatively couplable to one or more of the plurality of system controllers, wherein each of the gateway controllers to:
translate messages originating from an electrical load control device communicatively coupled to one of the plurality of system controllers from a first message format that includes the local address of the control device to a second message format that includes data representative of the local address of the electrical load control device and data representative of a unique identifier associated with the respective one of the plurality of system controllers communicatively coupled to the respective electrical load control device; and
translate a received message destined for an electrical load control device communicatively coupled to a system controller from the second message format to the first message format; and
a composite gateway server communicatively couplable to each of the plurality of gateway servers, wherein the composite gateway server to:
translate messages received from a communicatively coupled gateway server and destined for a network connected device from the second message format to a third message format that includes data indicative of a unique identifier associated with the respective communicatively coupled gateway server; and
translate messages received from the network connected device and destined for a communicatively coupled gateway server from the third message format to the second message format.

2. The electrical load control system of claim 1 wherein each of the plurality of gateway servers further comprise:
runtime circuitry to communicatively couple to the one or more of the plurality of system controllers; and
gateway circuitry to bidirectionally communicatively couple to the composite gateway server.

3. The electrical load control system of claim 2 wherein each of the plurality of gateway servers further comprise:
processor circuitry communicatively coupled to the gateway circuitry, the processor circuitry to execute a web application to communicatively couple, via one or more networks, the respective gateway server to one or more network devices.

4. The electrical load control system of claim 3 wherein the composite gateway server includes:
composite gateway circuitry to bidirectionally communicatively couple to each of the gateway servers; and
processor circuitry to execute a web application to communicatively couple, via one or more networks, the composite gateway server to one or more network devices.

5. The electrical load control system of claim 4 wherein the processor circuitry to further:
aggregate data received from each of at least some of the plurality of gateway servers.

6. The electrical load control system of claim 5 wherein the processor circuitry to further:
communicate, via the one or more networks, the aggregated data to the one or more network devices.

7. The electrical load control system of claim 6 wherein to communicate, via the one or more networks, the aggregated data to the one or more network devices, the processor circuitry to further:
communicate, via the one or more networks, the aggregated data to the one or more network devices responsive to receipt of a request from the one or more network devices for the aggregated data.

8. The electrical load control system of claim 4 wherein:
a first of the plurality of gateway servers to:
execute a first system management application to control one or more operational parameters of one or more communicatively coupled electrical load control devices; and
communicate with the composite gateway server via a first Application Programming Interface (API);
wherein a second of the plurality of gateway servers to:
execute a second system management application to control one or more operational parameters of one or more communicatively coupled electrical load control devices; and
communicate with the composite gateway server via a second API.

9. The electrical load control system of claim 8:
wherein the first system management application is different than the second system management application; and
wherein the first API and the second API are different APIs.

10. The electrical load control system of claim 8:
wherein the first system management application is different than the second system management application; and
wherein the first API and the second API are the same API.

11. The electrical load control system of claim 8 wherein the composite gateway server includes a third API to communicatively couple the composite gateway circuitry to the composite gateway processor circuitry.

12. The electrical load control system of claim 11 wherein each of the plurality of gateway servers includes a fourth API to communicatively couple the gateway server circuitry to the processor circuitry in the respective gateway server.

13. The electrical load control system of claim 2, further comprising:
alert circuitry communicatively coupled between the runtime circuitry and the gateway server circuitry, the alert circuitry to receive system controller data from the runtime circuitry, and using the received system controller data, communicate one or more alert messages to the gateway server circuitry.

14. An electrical load control network communication method, comprising:

storing, by each of a plurality of system controllers, data representative of a respective unique local address for each of one or more: electrical load control-source devices or electrical load control-target devices communicatively coupled to the respective system controller;

translating, by gateway server processor circuitry communicatively coupled to each of the plurality of system controllers, one or more messages originating from an electrical load control device communicatively coupled to one of the plurality of system controllers from a first message format that includes the local address of the electrical load control device to a second message format that includes data representative of the local address of the electrical load control device and data representative of a unique identifier associated with the respective one of the plurality of system controllers communicatively coupled to the electrical load control device; and translating a received message destined for an electrical load control device communicatively coupled to a system controller from the second message format to the first message format; and translating, by composite gateway server processor circuitry communicatively coupled to the gateway server processor circuitry, a message received from a communicatively coupled gateway server and destined for a network connected device from the second message format to a third message format that includes data indicative of a unique identifier associated with the respective communicatively coupled gateway server; and translating, by the composite gateway server processor circuitry, a message received from the network connected device and destined for a communicatively coupled gateway server from the third message format to the second message format.

15. The method of claim 14, further comprising:

aggregating, by the composite gateway server processor circuitry, data received from the gateway server; and communicating, by the composite gateway server processor circuitry, the aggregated data to the one or more network devices.

16. The method of claim 14, further comprising:

executing, by gateway server processor circuitry disposed in a first of the plurality of gateway servers, a first system management application to control one or more operational parameters of one or more electrical load control devices communicatively coupled to the first gateway server; and communicating, by the gateway server processor circuitry disposed in the first of the plurality of gateway servers, with the composite gateway server via a first Application Programming Interface (API);

wherein a second of the plurality of gateway servers to:

executing, by gateway server processor circuitry disposed in a second of the plurality of gateway servers, a second system management application to control one or more operational parameters of one or more electrical load control devices communicatively coupled to the second gateway server; and communicating, by the gateway server processor circuitry disposed in the second of the plurality of gateway servers, with the composite server via a second API.

* * * * *